US012675323B2

(12) United States Patent
Shveidel et al.

(10) Patent No.: US 12,675,323 B2
(45) Date of Patent: Jul. 7, 2026

(54) BACKGROUND MAINTENANCE TASK REGULATION AND SCHEDULING

(71) Applicant: Dell Products L.P., Hopkinton, MA (US)

(72) Inventors: Vladimir Shveidel, Pardes-Hana (IL); Maher Kachmar, Dearborn, MI (US)

(73) Assignee: Dell Products L.P., Hopkinton, MA (US)

(*) Notice: Subject to any disclaimer, the term of this patent is extended or adjusted under 35 U.S.C. 154(b) by 413 days.

(21) Appl. No.: 18/450,051

(22) Filed: Aug. 15, 2023

(65) Prior Publication Data

US 2025/0060991 A1     Feb. 20, 2025

(51) Int. Cl.
  *G06F 9/48*     (2006.01)
(52) U.S. Cl.
  CPC .................................. *G06F 9/4881* (2013.01)
(58) Field of Classification Search
  CPC .............................. G06F 9/4881; G06F 9/505
  See application file for complete search history.

(56) References Cited

U.S. PATENT DOCUMENTS

| | | | |
|---|---|---|---|
| 11,061,618 B1 * | 7/2021 | Glimcher | ............ G06F 16/2379 |
| 11,327,895 B1 | 5/2022 | Vankamamidi et al. | |
| 2015/0046279 A1 * | 2/2015 | Wang | .................... G06F 9/5027 |
| | | | 705/26.3 |
| 2016/0072704 A1 * | 3/2016 | Angel | ..................... H04L 47/83 |
| | | | 709/226 |
| 2022/0269426 A1 * | 8/2022 | Horev | ..................... G06F 3/067 |
| 2024/0281288 A1 * | 8/2024 | Huang | .................. G06F 9/5027 |

OTHER PUBLICATIONS

U.S. Appl. No. 17/148,872, filed Jan. 14, 2021, "Scheduling Storage System Tasks to Promote Low Latency and Sustainability," Shveidel, et al.
U.S. Appl. No. 17/967,240, filed Oct. 17, 2022, "Data Storage System With Dynamic Workload Adjustment Based on Headroom Estimation," Aleksey Kabishcher, et al.

* cited by examiner

*Primary Examiner* — Sisley N Kim
(74) *Attorney, Agent, or Firm* — BainwoodHuang

(57) ABSTRACT

In at least one embodiment, techniques for resource regulation and scheduling can include: allocating a first amount of tokens denoting an amount of CPU resources available for executing background (BG) maintenance tasks; determining a distribution of the first amount of tokens among a plurality of CPU cores upon which BG maintenance tasks are allowed to execute; and scheduling, by a scheduler component, a first plurality of BG maintenance tasks for execution on the plurality of CPU cores in accordance with a plurality of averages and in accordance with the distribution, wherein each of the plurality of averages denotes an average number of tokens of CPU resources consumed to complete execution of a corresponding one of the first plurality of BG maintenance tasks of a particular BG maintenance task subtype.

20 Claims, 8 Drawing Sheets

Figure 3:
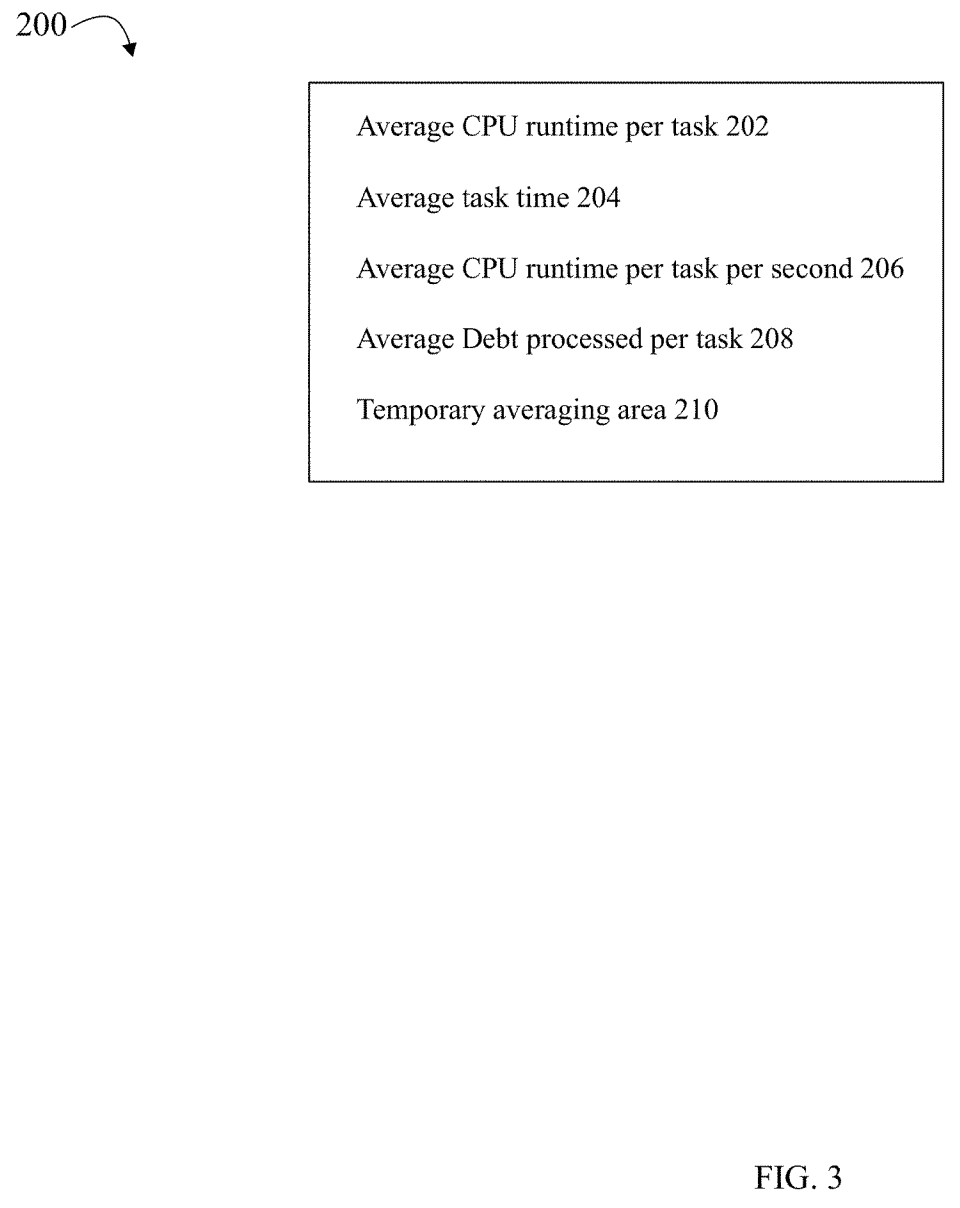

200

Average CPU runtime per task 202

Average task time 204

Average CPU runtime per task per second 206

Average Debt processed per task 208

Temporary averaging area 210

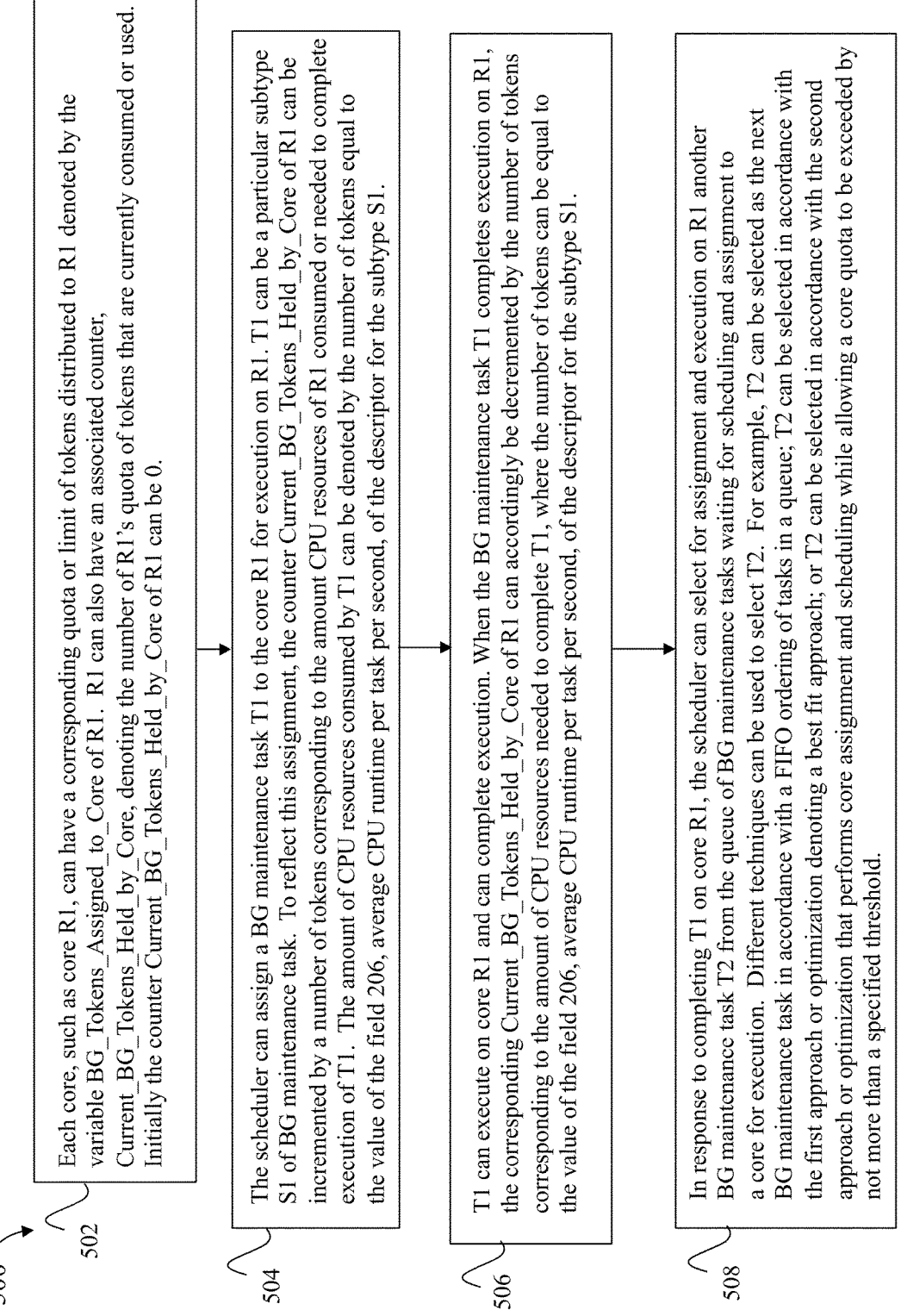

FIG. 6

Each core, such as core R1, can have a corresponding quota or limit of tokens distributed to R1 denoted by the variable BG_Tokens_Assigned_to_Core of R1. R1 can also have an associated counter, Current_BG_Tokens_Held_by_Core, denoting the number of R1's quota of tokens that are currently consumed or used. Initially the counter Current_BG_Tokens_Held_by_Core of R1 can be 0.

502

The scheduler can assign a BG maintenance task T1 to the core R1 for execution on R1. T1 can be a particular subtype S1 of BG maintenance task. To reflect this assignment, the counter Current_BG_Tokens_Held_by_Core of R1 can be incremented by a number of tokens corresponding to the amount CPU resources of R1 consumed or needed to complete execution of T1. The amount of CPU resources consumed by T1 can be denoted by the number of tokens equal to the value of the field 206, average CPU runtime per task per second, of the descriptor for the subtype S1.

504

T1 can execute on core R1 and can complete execution. When the BG maintenance task T1 completes execution on R1, the corresponding Current_BG_Tokens_Held_by_Core of R1 can accordingly be decremented by the number of tokens corresponding to the amount of CPU resources needed to complete T1, where the number of tokens can be equal to the value of the field 206, average CPU runtime per task per second, of the descriptor for the subtype S1.

506

In response to completing T1 on core R1, the scheduler can select for assignment and execution on R1 another BG maintenance task T2 from the queue of BG maintenance tasks waiting for scheduling and assignment to a core for execution. Different techniques can be used to select T2. For example, T2 can be selected as the next BG maintenance task in accordance with a FIFO ordering of tasks in a queue; T2 can be selected in accordance with the first approach or optimization denoting a best fit approach; or T2 can be selected in accordance with the second approach or optimization that performs core assignment and scheduling while allowing a core quota to be exceeded by not more than a specified threshold.

508

500

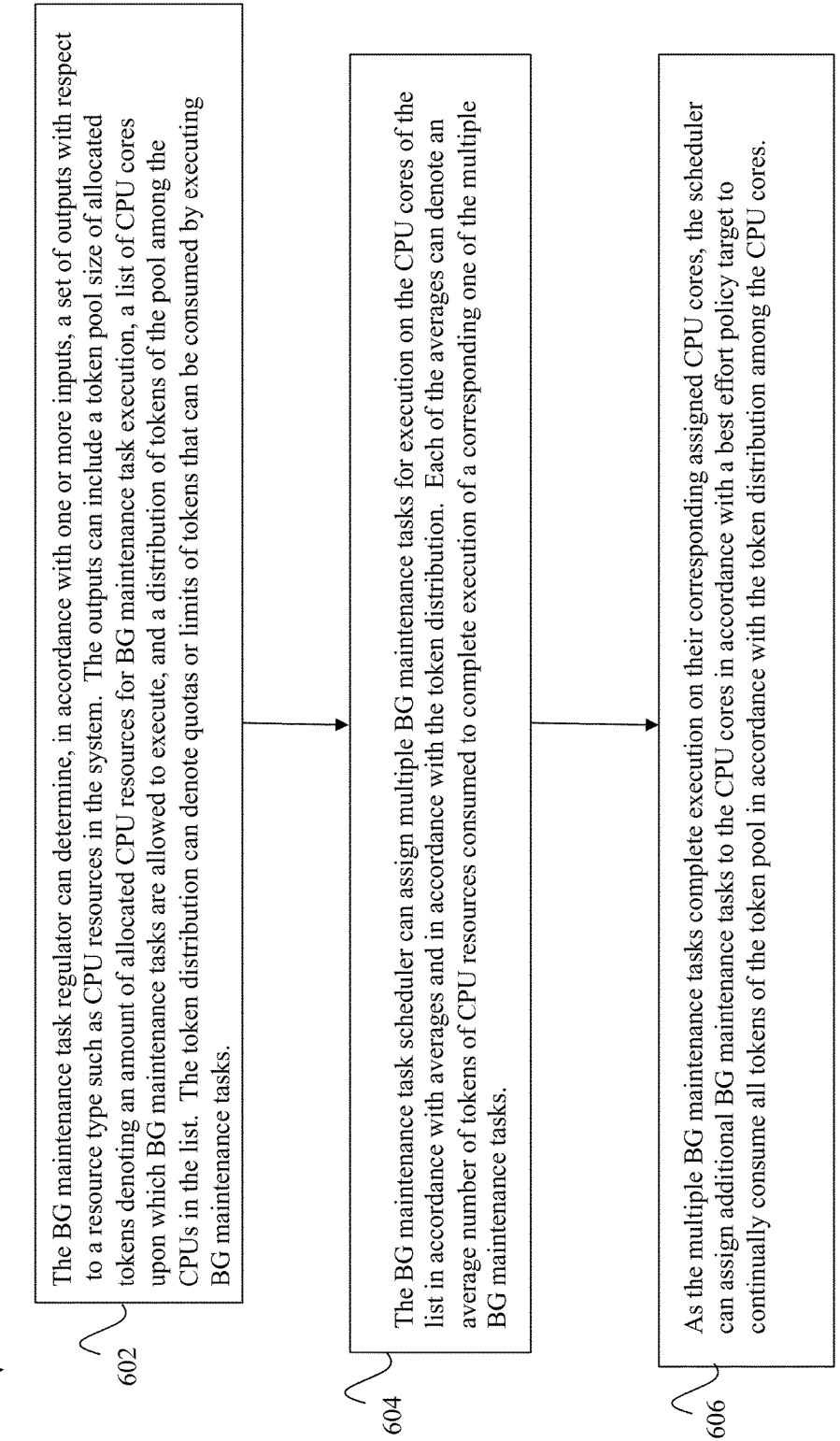

The BG maintenance task regulator can determine, in accordance with one or more inputs, a set of outputs with respect to a resource type such as CPU resources in the system. The outputs can include a token pool size of allocated tokens denoting an amount of allocated CPU resources for BG maintenance task execution, a list of CPU cores upon which BG maintenance tasks are allowed to execute, and a distribution of tokens of the pool among the CPUs in the list. The token distribution can denote quotas or limits of tokens that can be consumed by executing BG maintenance tasks.

The BG maintenance task scheduler can assign multiple BG maintenance tasks for execution on the CPU cores of the list in accordance with averages and in accordance with the token distribution. Each of the averages can denote an average number of tokens of CPU resources consumed to complete execution of a corresponding one of the multiple BG maintenance tasks.

As the multiple BG maintenance tasks complete execution on their corresponding assigned CPU cores, the scheduler can assign additional BG maintenance tasks to the CPU cores in accordance with a best effort policy target to continually consume all tokens of the token pool in accordance with the token distribution among the CPU cores.

BACKGROUND MAINTENANCE TASK REGULATION AND SCHEDULING

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O (input/output) operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: allocating a first amount of tokens denoting an amount of CPU resources available for executing background (BG) maintenance tasks; determining a distribution of the first amount of tokens among a plurality of CPU cores upon which BG maintenance tasks are allowed to execute; and scheduling, by a scheduler component, a first plurality of BG maintenance tasks for execution on the plurality of CPU cores in accordance with a plurality of averages and in accordance with the distribution, wherein each of the plurality of averages denotes an average number of tokens of CPU resources consumed to complete execution of a corresponding one of the first plurality of BG maintenance tasks of a particular BG maintenance task subtype.

In at least one embodiment, the first plurality of BG maintenance tasks can include a first BG maintenance task of a first BG maintenance task subtype and includes a second BG maintenance task of a second BG maintenance task subtype. The first BG maintenance task of the first BG maintenance task subtype can have a first corresponding one of the plurality of averages denoting an average number of tokens of CPU resources consumed to complete execution of any BG maintenance task having the first BG maintenance task subtype. The second BG maintenance task of the second BG maintenance task subtype can have a second corresponding one of the plurality of averages denoting an average number of tokens of CPU resources consumed to complete execution of any BG maintenance task having the second BG maintenance task subtype. The first corresponding average can denote a first number of tokens that is different from a second number of tokens denoted by the second corresponding average.

In at least one embodiment, the first BG maintenance task can execute on a first core of the plurality of CPU cores, the first core can have a first quota and a first counter, the first quota can denote a portion of the first amount of tokens distributed to the first core, and the first counter can denote an amount of the first quota currently consumed by executing one or more BG maintenance tasks on the first cores. A queue can include the first plurality of BG maintenance tasks having a FIFO (first in first out) ordering, and wherein the method can further comprise: selecting, from the queue in accordance with the FIFO ordering of the first plurality of BG maintenance tasks, the first BG maintenance task for execution on the first core; responsive to said selecting, adding the first number of tokens needed to complete execution of the first BG maintenance task to the first counter of the first core; and determining, as a result of said adding, that the first counter has a corresponding value that does not exceed the first quota of the first core.

In at least one embodiment, processing can include: completing execution of the first BG maintenance task on the first core; and responsive to said completing, performing first processing including: decrementing the first number of tokens from the first counter of the first core; selecting, from the queue in accordance with the FIFO ordering, the second BG maintenance task for execution on the first core; responsive to said selecting the second BG maintenance task, adding the second number of tokens needed to complete execution of the second BG maintenance task to the first counter of the first core; and determining, as a result of adding the second number of tokens, that the first counter has a value that does not exceed the first quota of the first core. The first processing can include: updating a first plurality of totals in a first descriptor tracking metrics for the first BG maintenance task subtype in accordance with a first plurality of measured or observed values based on actual execution of the first BG maintenance task of the first BG maintenance task subtype, wherein the first plurality of measured or observed values includes a first task time denoting an elapsed amount of time that the first BG maintenance task held or owns the first number of tokens, a first CPU time denoting an amount of CPU runtime consumed to complete execution of the first BG maintenance task, and a first debt amount of first debt processed by the first BG maintenance task; and determining, in accordance with the first plurality of totals of the first descriptor, updated values for a first plurality of averages of the first descriptor, wherein the first plurality of averages denotes average values of tracked metrics for the first BG maintenance task subtype, wherein the first plurality of averages includes a first average CPU runtime of a single BG maintenance task of the first BG maintenance task subtype, a first average task time, the first corresponding average denoting a first average number of tokens corresponding to an average amount of CPU resources consumed to complete execution of a single BG maintenance task of the first BG maintenance task subtype, and a first average amount of first debt processed by a single BG maintenance task of the first BG maintenance task subtype.

In at least one embodiment, each of the first plurality of BG maintenance tasks can be one of a plurality of predefined BG maintenance task subtypes. The plurality of predefined BG maintenance task subtypes can include a GC (garbage collection) task type, a decref (decrement reference count) task type, a compression task type, and a deduplication task type. A first of the BG maintenance tasks can be the GC task type that performs GC processing on back-end (BE) non-volatile storage used for storing user data or content of storage objects to increase an amount of free blocks of BE non-volatile storage. A first of the BG maintenance tasks can be the decref task type that processes one or more deferred decref operations, wherein each of the deferred decref operations can represent a MD (metadata) update operation to a MD page to decrement a reference count stored in the MD page. A first of the BG maintenance tasks can be the compression task type that performs compression of content stored on BE non-volatile storage. A first of the BG maintenance tasks can be the deduplication task type that performs data deduplication of content stored on BE non-volatile storage.

In at least one embodiment, processing can include generating, by a regulator component, a first set of outputs including a token pool size corresponding to the first amount of tokens denoting an amount of CPU resources available for executing background (BG) maintenance tasks, the distribution of the first amount of tokens among the plurality of CPU cores upon which BG maintenance tasks are allowed to execute, and a list of CPU cores upon which BG maintenance tasks are allowed to execute, wherein the list can include the plurality of CPU cores. The first plurality of BG maintenance tasks scheduled by the scheduler component can consume the first amount of tokens allocated for BG maintenance tasks in accordance with the distribution.

In at least one embodiment, a queue can include the first plurality of BG maintenance tasks, and processing can further comprise: selecting, from the queue in accordance with a best fit policy, the first BG maintenance task for execution on the first core, wherein the best fit policy specifies to select a BG maintenance task from the queue expected to consume a first number of tokens that matches a remaining amount of available tokens of the first core; responsive to said selecting, adding the first number of tokens needed to complete execution of the first BG maintenance task to the first counter of the first core; and determining, as a result of said adding, that the first counter has a corresponding value that does not exceed the first quota of the first core.

In at least one embodiment, a queue can include the first plurality of BG maintenance tasks, and processing can further comprise: selecting, from the queue and in accordance with a policy, the first BG maintenance task for execution on the first core, wherein the policy allows for selecting a BG maintenance task from the queue expected to consume a first number of tokens that exceeds, by not more than a threshold amount, a remaining amount of available tokens of the first core; responsive to said selecting, adding the first number of tokens needed to complete execution of the first BG maintenance task to the first counter of the first core; and determining, as a result of said adding, that the first counter has a corresponding value that does not exceed the first quota of the first core by more than the threshold amount.

BRIEF DESCRIPTION OF THE DRAWINGS

Features and advantages of the present disclosure will become more apparent from the following detailed description of exemplary embodiments thereof taken in conjunction with the accompanying drawings in which:

FIG. 3 is an example of various metrics that can be collected and maintained for each background (BG) maintenance task subtype in at least one embodiment in accordance with the techniques of the present disclosure.

FIGS. 4A, 6 and 7 are flowcharts of processing steps that can be performed in an embodiment in accordance with the techniques of the present disclosure.

DETAILED DESCRIPTION OF EMBODIMENT(S)

Figure 1:
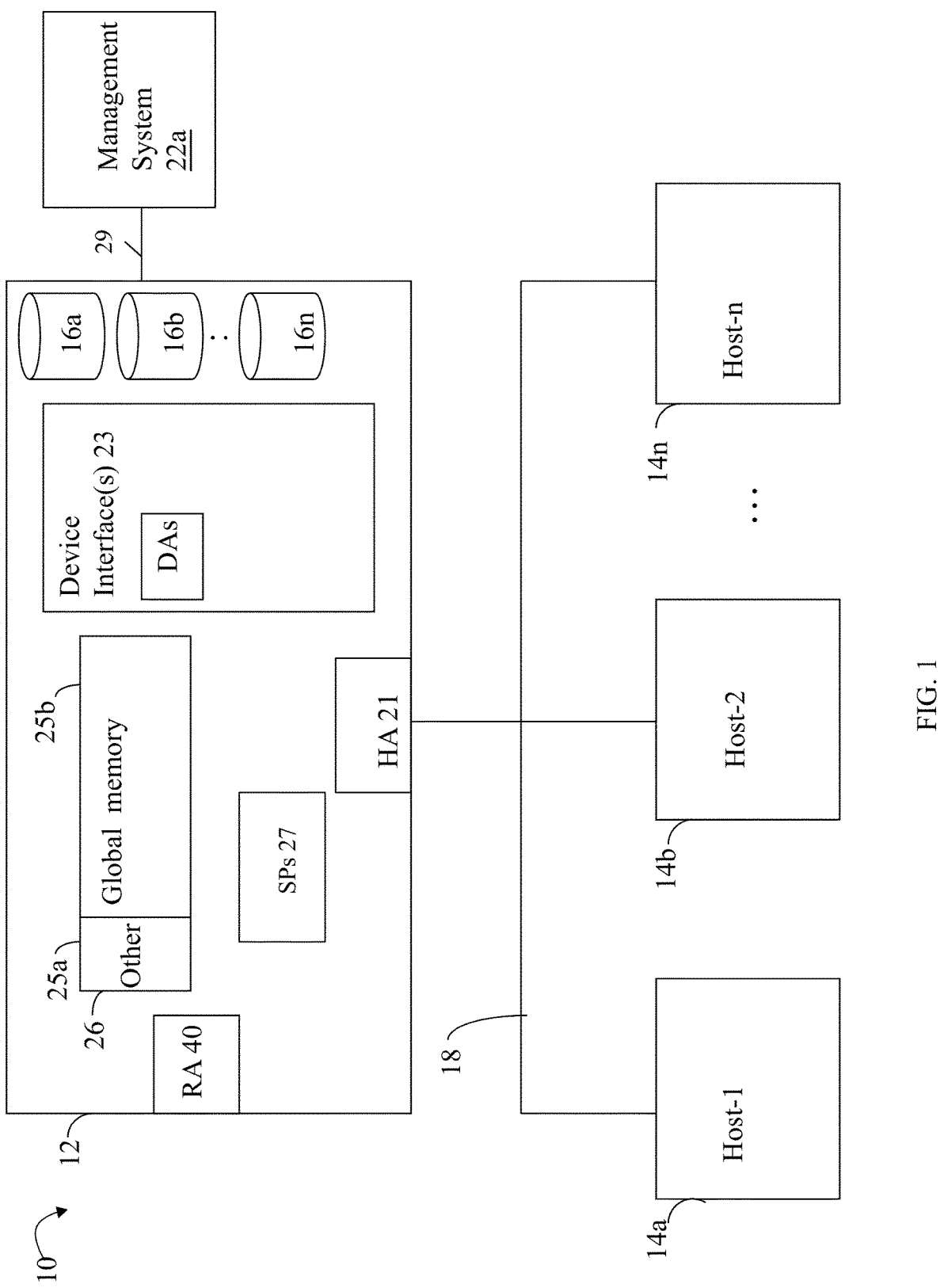
FIG. 1 is an example of components of at least one embodiment of system in accordance with the techniques of the present disclosure.

A data storage system can perform many different workflows or tasks in connection with servicing received I/O operations and providing continuous service. In at least one system, such workflows or tasks can include synchronous I/O tasks or latency critical tasks (LCTs), and different classes and types of background (BG) tasks. BG tasks can include a first class of BG critical tasks and a second class of BG maintenance tasks. BG maintenance tasks can include, for example, garbage collection, volume deletion, late-stage deduplication, and the like. BG critical tasks can include tasks related to I/O operations that can be completed in the background. BG critical tasks can include, for example, flushing of a user data log of recorded writes and other operations, flushing of a metadata (MD) log, and the like. Regulation and prioritization of all such workflows or tasks can be non-trivial. In particular, regulation of BG maintenance tasks can be especially challenging due to the various types of BG maintenance tasks with different types of collected debts, different urgencies in connection with different system resources, and the like. A debt can generally denote accumulated deferred, delayed or postponed tasks. Thus a debt such as related to a particular subtype or subclass of BG maintenance task of garbage collection (GC) discussed elsewhere herein can include deferred, delayed or postponed GC BG maintenance tasks resulting in a GC debt. In at least one embodiment, GC debt can be measured or expressed, for example, as a number or amount of physical storage units such as those processed, freed, and/or reclaimed by GC tasks.

In at least one system, an adaptive regulation mechanism can be used based on tokens where each token can represent a same unit or fixed amount of a resource such as CPU resources. The adaptive regulation mechanism based on tokens allocated per BG task, generally, can provide certain BG processing progress with reasonable impact on synchronous I/O or LCT tasks, providing a certain level of adaptiveness. However, the adaptive regulation mechanism in at least one system can have drawbacks based, at least in part, on the assumption that each BG task requires approximately the same number of resources for processing to completion.

In at least one system as noted above, tokens can be used to represent resources available for allocation and consumption by the different tasks. For example, tokens can be used to represent an amount of CPU resources. In at least one embodiment, a single token denoting an amount of CPU resources can denote the assumed amount of CPU resources consumed when processing any BG task such as, for example, any BG critical task and any BG maintenance task. Thus, the foregoing simplifying assumption is that each BG task of all types and classes across a system needs approximately the same number of resources, such as CPU resources, for processing. However, the foregoing can be an erroneous assumption in that in actual execution, various BG tasks can actually consume a different amount of the CPU resource than as denoted by the single assumed token. Different BG tasks, such as different BG maintenance tasks, can have various and different CPU resource requirements rather than the same assumed amount of consumed CPU resource denoted by the single token. As a result, actual CPU resource consumption, as well as other resource consumption, among the various BG tasks can vary. Thus, when a single token is assigned to a BG task under the foregoing assumption, the impact upon the system can be unknown and random. In at least one embodiment, use of a single token noted above to generally denote the amount of CPU resources consumed by any BG task can result in the following problems discussed below.

A first problem that can result from operating under the assumption that each BG task consumes the same amount of CPU resources denoted by a single token is performance instability and jittering with respect to I/O performance. In at least one embodiment, the single token is assumed to be associated with some average CPU consumption. When CPU-intensive BG tasks are prioritized (e.g., such as a result of high debt, or other critical resource level being reached) and executed, more CPU resources than estimated by the tokens can be consumed. As a result, the system and CPU resources can actually be more overloaded than expected whereby I/O latency can be adversely impacted in that it is higher than expected. Additionally, the opposite result can occur when lightweight BG tasks are executed and actually consume less CPU time to complete than expected as denoted by the single token. In this latter case, the system can be underloaded and the CPU resources can be underutilized. It should be noted that besides general performance instability noted above, use of a single token to denote CPU or other resources expected to be consumed by any BG task to complete can make the process of performance testing and certification of changes extremely challenging. For example, it can be very difficult to differentiate an actual performance impact resulting from a tested feature from other random fluctuations or performance changes associated with execution of BG tasks.

A second problem that can result from operating under the assumption that each BG task consumes the same amount of CPU resources denoted by a single token is poor resource utilization, such as poor CPU utilization, and an underestimation of BG debt collected for deferred or postponed BG tasks. For example, as noted above, underutilization of CPU resources can occur.

A third problem that can result from operating under the assumption that each BG task consumes the same amount of CPU resources denoted by a single token is unpredictability in debt handling such as unpredictability in measuring an amount of debt incurred and unpredictability in determining an amount of resources that will be consumed when processing incurred debt. The foregoing can generally denote unpredictable and poorly controlled debt behavior. In at least one system, priority and share of overall tokens for BG tasks with respect to other tasks of higher priority (e.g., classes of tasks such as I/O or LTC tasks) can be based, at least in part, on debt size. However, based on such inaccuracies in resource requirements using the generic single token, a system generally does not have an accurate estimate of resources needed to process an accumulated debt of deferred or postponed BG tasks. In some cases, such inaccuracies can result in an inability to process the accumulated debt of BG tasks in a timely manner and can result in undesirable system states, such as, for example, result in the system stop servicing I/Os, data unavailability, and the like.

According, described in the following paragraphs are techniques of the present disclosure that provide for addressing the foregoing problems.

In at least one embodiment, the techniques of the present disclosure further subdivide the BG maintenance task class or classification into subclasses, subclassifications, or subtypes based on the particular BG maintenance task. For example, in at least one embodiment, BG maintenance tasks can include the following BG maintenance task subtypes: GC task, deduplication task, compression task, decref task, and others consistent with discussion herein. For each BG maintenance task subtype, there can be multiple atomic code instances such as multiple tasks, processes, jobs, or threads of the single BG maintenance task subtype executing concurrently.

For each BG maintenance task subtype, processing can measure various metrics for each single task, thread, or generally other atomic unit of scheduling. The following paragraphs can refer to the atomic unit of scheduling to be a task or job but more generally any suitable scheduling unit can be used to denote the code entity executing that can vary with embodiment. Also, the following paragraphs can make reference to the resource of CPU time or CPU run time and specific CPU run time units. However, more generally, the techniques of the present disclosure can be used in connection with other resources and resource-associated units.

In at least one embodiment, the metrics measured for each BG maintenance task can include:

1) The actual number or amount of the resource consumed while processing the task to completion. For example, the resource can be CPU run time units or CPU cycles. The amount of CPU runtime units or CPU cycles consumed can be, for example, N milliseconds or N microseconds of CPU runtime, where N is a positive integer.

2) The task time or elapsed amount of time the task owns, possesses or holds the token. In at least one embodiment, task time can denote the elapsed time from when the task is started to when the task is completed.

3) The amount of processed debt per task or token in units relevant for the specific debt, or resource thereof.

From the foregoing metrics in at least one embodiment, various averages can be determined and tracked for each BG maintenance task subtype. One of the averages tracked per BG maintenance task subtype can denote an average number of tokens corresponding to an average number of CPU runtime units or cycles consumed based on observed or measured values of CPU time needed to complete execution of a specified number of tasks of the particular subtype. In at least one embodiment, a token pool size can be determined denoting a number of tokens allocated or available for use in connection with executing BG maintenance tasks of the various defined subtypes. A distribution of the tokens allocated for BG maintenance task execution among multiple CPU cores of the system can be determined. In at least one embodiment, averages of the number of tokens needed to complete the multiple BG maintenance task subtypes can be used in connection with scheduling multiple BG maintenance tasks of various subtypes for concurrent execution across the multiple CPU cores of the system in accordance with the distribution. As the multiple BG maintenance tasks complete execution on their corresponding assigned CPU cores, the scheduler can assign additional BG maintenance tasks to the CPU cores in accordance with a best effort policy target to continually consume all tokens of the token pool in accordance with the distribution of allocated tokens among the CPU cores.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 can be connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, also be located in different physical locations. The communication medium 18 used for communication between the host systems 14a-14n and the data storage system 12 of the system 10 can use a variety of different communication protocols such as block-based protocols (e.g., SCSI, Fibre Channel, ISCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques of the present disclosure. It should also be noted that an embodiment can include data storage arrays or other components from one or more vendors.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs can refer to solid state electronics devices as distinguished from electromechanical devices, such as hard drives, having moving parts. Flash devices or flash memory-based SSDs are one type of SSD that contains no moving mechanical parts. The flash devices can be constructed, for example, using nonvolatile semiconductor NAND flash memory.

The data storage system can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage system can include one or more RAs used, for example, to facilitate communications between data storage systems. The data storage system can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage system. In one embodiment, the device interfaces 23 can perform data operations using a system cache that can be included in the global memory 25b, for example, when communicating with other device interfaces and other components of the data storage system. The other portion 25a is that portion of the memory that can be used in connection with other designations that vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 can also provide data to the host systems 14a-n also through the channels. The host systems 14a-n do not address the drives or devices 16a-16n of the storage systems directly, but rather access to data can be provided to one or more host systems from what the host systems view as a plurality of logical devices, logical volumes (LVs) which can also referred to herein as volumes or logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage referenced by such logical unit numbers. The LUNs may or may not correspond to the actual or physical disk drives or more generally physical storage devices. For example, one or more LUNs can reside on a single physical disk drive, data of a single LUN can reside on multiple different physical devices, and the like. Data in a single data storage system can be accessed by multiple hosts allowing the hosts to share the data residing therein. The HAs can be used in connection with communications between a data storage system and a host system. The RAs can be used in facilitating communications between two data storage systems. The DAs can include one or more type of device interface used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques of the present disclosure, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques of the present disclosure can be be made with respect to a physical data storage system and its physical components (e.g., physical hardware for each HA, DA, HA port and the like), the techniques of the present disclosure can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a can be a computer system which includes data storage system management software or application executing in a web browser. A data storage system manager can, for example, view information about a current data storage configuration such as LUNs, groups of LUNs, and the like, on a user interface (UI) in a display device of the management system 22a. Alternatively, and more generally, the management software can execute on any suitable processor in any suitable system. For example, the data storage system management software can execute on a processor of the data storage system 12.

In some embodiments, each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target logical address from which data is read from, or written to, depending on whether the I/O operation is, respectively, a read or a write operation request. The target logical address of the received I/O operation can be expressed in terms of a LUN or volume and logical address or offset location (e.g., LBA or logical block address) on the LUN. Processing can be performed on the data storage system to further map the target logical address of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system that includes multiple storage processors (SPs). Each of the SPs 27 can y be a CPU including one or more "cores" or processors and each can have their own memory used for communication between the different front end and back end components rather than utilize a global memory accessible to all storage processors. In such embodiments, the memory 26 can represent memory of each such storage processor.

Generally, the techniques of the present disclosure can be used in connection with any suitable storage system, appliance, device, and the like, in which data is stored.

The data path or I/O path can be characterized as the path or flow of I/O data through a system. For example, the data or I/O path is the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12.

The data path and control path define two sets of different logical flow paths. In at least some of the data storage system configurations, at least part of the hardware and network connections used for each of the data path and control path can differ. For example, although both control path and data path generally use a network for communications, some of the hardware and software used can differ. For example, with reference to the FIG. 1, a data storage system can have a separate physical connection 29 from a management system 22a to the data storage system 12 being managed whereby control commands are issued over such a physical connection 29. However, user I/O commands may never be issued over such a physical connection 29 provided solely for purposes of connecting the management system to the data storage system. In any case, the data path and control path each define two separate logical flow paths.

Figure 2:
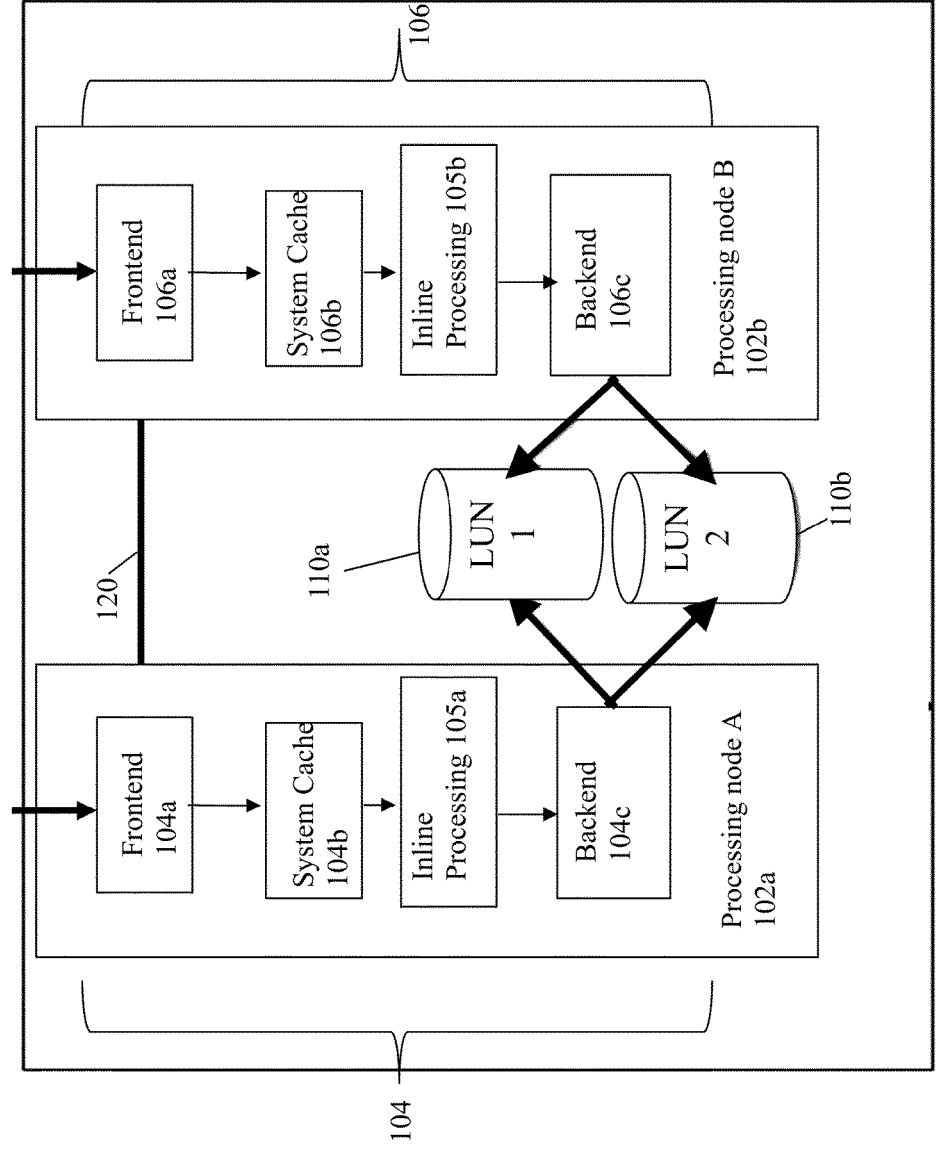
FIG. 2 is an example illustrating the I/O path or data path in connection with processing data in an embodiment in accordance with the techniques of the present disclosure.

With reference to the FIG. 2, shown is an example 100 illustrating components that included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one or more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O is be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is referred to herein as an active-active configuration.

In connection with a write operation received from a host, or other external client, and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Thus, in such an embodiment, rather than have dedicated hardware for an FA, DA, and the like, the components described above for the FA, DA, RA, and the like, can be viewed as logical or functional components where the tasks of such components can be implemented by code executed by processors of the nodes as illustrated in FIG. 2. Each node of the pair can include its own resources such as its own local (i.e., used only by the node) resources such as local processor(s), local memory, and the like.

Consistent with other discussion herein, a cache can be used for caching write I/O data and other cached information. The other cached information can include, for example, cached operations or commands such as create snapshot commands. In one system, the cache can be implemented using multiple caching devices or PDs, such as non-volatile (NV) SSDs such as NVRAM devices that are external with respect to both of the nodes or storage controllers. The caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein.

One or more caching devices or PDs can provide a persistent cache sometimes referred to as a data journal, log or log tier used in the data storage system. In such a system, the caching devices or PDs are non-volatile log devices or PDs upon which the log is persistently stored. In at least one embodiment, in addition to such a persistently stored data log, one or more of the nodes can also include node-local in-memory copies of information of the data log. In at least one embodiment, the node-local in-memory copies of information of the data log stored on each node can be stored in volatile memory, such as a RAM, that is local to the node and can be accessed only within the node. For example, a process or thread of code executing on a core or processor of the node can access for reading and/or writing the RAM or other volatile memory that is local to the node.

In a data storage system, minimizing the latency of I/O requests is a critical performance metric. In at least one data storage system using the dual node architecture such as described in connection with FIG. 2, for write operations, latency is determined by the amount of time taken to store the write data in the data log where the write data is visible to both nodes or controllers of the system.

Consistent with other discussion herein, the data log can be used to optimize write I/O operation latency. Generally, the write I/O operation writing data is received by the data storage system from a host or other client. The data storage system then performs processing to persistently record the write operation in the data log. Once the write operation is persistently recorded in the data log, the data storage system can send an acknowledgement to the client regarding successful completion of the write operation. At some point in time subsequent to logging the write operation the data log, the write operation is flushed from the data log to the BE PDs. In connection with flushing the recorded write operation and write data from the data log, the data written by the write operation is stored on non-volatile physical storage of a back-end (BE) PD or long term persistent storage. The space of the data log used to record the write operation that has been flushed can now be reclaimed for reuse. The write operation can be recorded in the data log in any suitable manner and can include, for example, recording a target logical address to which the write operation is directed and recording the write data written to the target logical address by the write operation.

In the data log in at least one embodiment, each logged operation can be recorded in the next logically sequential record of the log. For example, a logged write I/O and write data (e.g., write I/O payload) can be recorded in a next logically sequential record of the log. The data log can be logically circular in nature in that once a write operation is recorded in the last record of the data log, recording of the next write proceeds with recording in the first record of the data log.

Flushing a recorded write I/O of the data log can include creating and/or updating one or more metadata (MD) pages of mapping information. The recorded write I/O can write content C1 to a target logical address LA1, such as an offset or LBA on a LUN or volume. Flushing the recorded write of the log can include storing C1 on BE non-volatile storage or PD noted above and also creating or updating MD pages of mapping information. The mapping information can map the target logical address LA1 to a physical storage location on BE non-volatile storage or PD where the content C1 is stored.

In at least one embodiment, a metadata (MD) log can be used to temporarily store MD changes made to MD pages. Such MD changes can occur as a result of flushing a recorded write I/O of the data log noted above. At a later point in time, MD updates or changes recorded in the MD log can also be flushed from the MD log and persisted to persistent copies of MD pages on BE non-volatile storage or PDs.

In at least one embodiment, a portion of volatile memory can be used as a form of cache for caching user or client data of I/O operations. For example, in at least one embodiment, read data used for servicing read I/Os can be stored in a volatile memory cache.

Although non-volatile memory can be used for the data log and MD log and volatile memory can be used for caching read and/or write data, use of the foregoing are not required and other forms of media can be used in an embodiment.

Consistent with other discussion herein in connection with FIGS. 1 and 2, a host can issue I/O requests to a data storage system. An SP of the data storage system receives the I/O requests and initiates further processing. The I/O requests can include read and write I/O operations. Read requests or read I/O operations include requests to read specified regions of specified data objects, such as a LUN and/or file system. Read requests can be serviced from cache, such as a volatile memory cache, which may hold the data requested. In the event of a read cache miss, the SP can fetch the requested data from persistent storage, such as a BE PD, where the read data can be stored in the cache and then returned to the requesting host. In either case of a read cache miss or hit, the requested read data can be returned to the requesting host in a read response. Latency of the read request or I/O operation can be measured as the time between arrival of the read request or read I/O operation and return of the response which includes the requested data. Tasks associated with receiving the read requests and obtaining the requested data can be characterized as latency-critical tasks (LCTs) or synchronous I/O processing tasks.

As for writes, write requests or I/O operations specify data to be written to persistent storage structures, such as a LUN and/or file system, hosted by the data storage system. Processing of write requests or I/O operations can include temporarily storing the data being written in the data log. Once the data of a write request or I/O operations has been successfully persisted to the data log, an acknowledgement can be returned to the requesting host that originated the write request. Upon returning the acknowledgement to the host from the data storage system, the host can consider the write request or I/O operation as completed. Latency of a write request can be measured as the time between arrival of the write request or I/O operation and return of the acknowledgement to the host or other client which originated the write request. Tasks associated with receiving write requests, persisting the specified write data in the data log, and issuing acknowledgements can also be considered LCTs or synchronous I/O processing tasks. Additionally, although write requests or I/O operation can be deemed complete for latency purposes upon issuance of acknowledgements to the originating host or other client, additional tasks are needed before the writes can be fully incorporated into the persistent structures (e.g., LUN and/or file system). Such additional tasks associated with write requests or I/O operations in at least one embodiment can include, for example, flushing the persisted data in the data log to lower processing levels in the storage system, with the data eventually being persistently stored on BE PDs. As an example, flushing from the data log can include performing inline processing, such as inline deduplication and/or inline compression as discussed above such as in connection with FIG. 2. Also, MD changes that accompany the data writes can be stored in the MD log, and such MD changes can also be flushed to persistent structures on BE PDs. Although the tasks associated with flushing from the data log and MD log as well as performing inline processing are not latency-critical, they can nonetheless be characterized as bandwidth-critical tasks or BG critical tasks (BCTs) given that a failure of the SP to keep up with these BCT activities can result in severe consequences. For example, if the data log becomes full, it loses the ability to accept any new data, causing the data storage system to deny all write requests until it can create new space in the data log (e.g., by flushing accumulated data such that the space occupied by the data becomes free). Such a log-full condition causes latency to jump to an unacceptable level and should be avoided. Thus, tasks performed by the SP can include LCTs or synchronous I/O processing tasks, e.g., for generally synchronous activities that require the fastest responses, and BCTs, e.g., for generally asynchronous activities that complete the activities started by the synchronous activities. Some additional types of activities can be more properly characterized as background (BG) maintenance tasks (BMTs). For example, BMTs can include tasks that are not immediately urgent, such as garbage collection (GC), background deduplication (DD), background compression, relocation of data, decref (decrement reference count) processing, and the like.

Consistent with other discussion herein, a data storage system can perform many different workflows or tasks in connection with servicing received I/O operations and providing continuous service. The different workflows or tasks can have different relative priorities or importance, constraints, and the like. In at least one embodiment, the various tasks can be scheduled, prioritized and/or scaled according to defined policies or mechanism with various goals.

In at least one embodiment, the various defined policies or mechanisms can provide various goals include: minimal I/O latency; maximal I/O bandwidth; providing system sustainability, serviceable and general health; adaptiveness such as to different I/O workload patterns and conditions; and maximal resource utilization.

In at least one system, such workflows or tasks can include synchronous I/O tasks or latency critical tasks (LCTs), and different classes and types of BG tasks. BG tasks can include a first class of BG critical tasks and a second class of BG maintenance tasks. BG critical tasks or BCTs can include asynchronous I/O processing tasks related to I/O operations that can be completed in the background. BG critical tasks can include, for example, flushing of a user data log of recorded writes and other operations, flushing of a metadata (MD) log, RAID rebuild operations, and the like. BG maintenance tasks or BMTs can include, for example, garbage collection (GC), volume (e.g., storage object) deletion, late-stage or background deduplication, late-stage or background compression, snapshot operations, decref operations, and the like.

In at least one embodiment, GC can be performed with respect to BE non-volatile storage such as where content or user data is written. With a log-based system, each recorded write I/O that write content to a target logical address LA1 can be recorded in the log (sometimes referred to as a user data log). Subsequently, the recorded write I/O can be flushed from the log and its corresponding contents written to a new physical storage location on BE non-volatile storage. Over time, there can be overwrites to the same target logical address LA1 where each such subsequent write results in new content being written to a new storage location on BE non-volatile storage. As a result, there can be holes of invalid content (such as overwritten content) intermixed with current valid content stored on BE non-volatile storage. GC processing performed with respect to BE non-volatile storage can attempt to compact or consolidate valid content from multiple source blocks only partially filled with valid content into a single target block of valid content thereby freeing or making available the multiple source blocks. To further illustrate in at least one embodiment, GC can be performed to consolidate the valid data in 2 partially filled source PLBs into a single target PLB by copying the valid data from the 2 source PLBs to the target PLB. In this case, the foregoing consolidation results in a net gain of 1 free PLB by freeing the 2 source PLBs, and consuming or using the single target PLB that contains the consolidated valid data from the 2 original source PLBs. As another example, consider 4 source PLBs each having a 25% utilization (e.g., each PLB contains 25% valid data with the remaining 75% of the PLB containing invalid or free holes of storage). In this case, GC can be performed to consolidate the valid data of the 4 source PLBs into a single target PLB by copying the valid data from the 4 source PLBs to the target PLB. The foregoing consolidation results in a net gain of 3 free PLBs by freeing the 4 source PLBs, and consuming or using the single target PLB that contains the consolidated valid data from the 4 original source PLBs. In at least one embodiment, the source and target PLBs can be selected for GC to generate at least one net free PLB. It should be noted that GC can more generally be performed for content to generate net free PLBs by combining content of any suitable number of partially filled source PLBs and storing the aggregated valid content of the source PLBs in a single target PLB.

The following are examples of different classes or classifications of tasks and associated policies in at least one embodiment:

Synchronous I/O task or LCT task policy. The policy for this class can be optimized to provide minimal I/O latency for synchronous I/O tasks or LCT tasks. Providing minimal I/O latency can be the highest priority of the system. As may be needed, I/O latency can become a lower priority, for example, if there is a critical resource shortage that can immediately impact serviceability. For example, excessively deferring GC with respect to backend (BE) non-volatile storage can result in BE non-volatile storage reaching a critical level or utilization where the amount of free storage can fall below a minimum level. If the system keeps deferring GC tasks, an out of storage (OOS) state of BE storage can result. Accordingly, once the foregoing critical level of BE free storage is reached due to deferring GC tasks, the system can temporarily lower the priority of minimal latency and thus lower the priority of I/O tasks in order to perform the currently more urgent BG maintenance task of GC.

BG critical task policy. The policy for this class can provide a goal where tasks of this class can be performed at approximately the same rate or pace as synchronous I/O tasks. However, BG critical tasks in at least one embodiment can be optimized for bandwidth rather than latency as a primary or first goal. The BG critical tasks policy can allow flexibility in that preference or priority can be given to synchronous I/O tasks as may be needed, for example, during short periods increased I/O workload where a burst of I/Os can be received in a short time period.

BG maintenance task policy. BG maintenance tasks can also be characterized in one aspect as a type of I/O continuation. However, BG maintenance tasks can generally be postponed for a much longer time than BG critical tasks such as when the system is in a low or idle I/O workload state, where BG maintenance tasks can use resources not otherwise needed for servicing synchronous I/O tasks and not needed for servicing BG critical tasks. Such flexibility provides for better resource utilization and can thus improve overall system performance. Thus although BG maintenance tasks can be critical for system sustainability such as where BG maintenance tasks are deferred for an extended period of time, a BG maintenance task policy can schedule BG maintenance tasks generally according to a residual principle provided that incurred debt of BG maintenance tasks does not reach a critical level. A debt can generally denote deferred or postponed tasks. Thus a debt can be related to particular BG maintenance tasks that are deferred or postponed. Such particular BG maintenance tasks can, for example, increase an amount of a resource that is free or available. In at least one embodiment, such an increase in the amount of the freed resource is one measure of a decrease in debt size.

As noted above in at least one embodiment, BG maintenance tasks can be performed based on a residual principle. A scheduling cycle can be specified as a defined amount of time such as, for example, 500 microseconds. In at least one embodiment, BG maintenance tasks can be scheduled to run during a scheduling cycle based on a residual principle. In other words in such an embodiment, BG maintenance tasks can be scheduled to run when the CPU resource is idle in that there are no other tasks of other higher priority classes ready to run. More generally in connection with a resource, BG maintenance tasks can be scheduled to use the resource when the resource is otherwise idle in that there are no other tasks of higher priority classes (e.g., the BG critical class and the synchronous I/O or LCT class) waiting for the resource.

In at least one embodiment, there can be peaks, bursts or increases in I/O workload where the system can postpone BG tasks or operations, such as BG maintenance tasks, during such peak periods. During such peak I/O workload periods, additional resources and priority can be given to I/O tasks or LCT tasks over lower priority BG tasks, such as BG maintenance tasks. In at least one embodiment where BG maintenance tasks can be executed based, at least in part, on the residual principle discussed elsewhere herein, BG maintenance tasks can be continually deferred or postponed during such peaks or bursts of I/O workload. In at least one embodiment, the following can generally denote the priority, from highest to lowest, assigned to different classes or types of tasks or workflows: I/O tasks or LCT tasks (highest priority), BG critical tasks (middle or second priority), and BG maintenance tasks (lowest priority). Thus, BG maintenance tasks can be deferred or postponed during bursts or increases of I/O workload. Such deferred or postponed tasks or operations, such as BG maintenance tasks, can be characterized as a debt accumulated during a time period T. In at least one embodiment, the system can operate based on a policy that any such workload debt accumulated during peak periods within T should also be completed during periods of low or idle I/O workload within T. If debt accumulated within T reaches a critical level, then an increased urgency results in giving temporary higher priority to particular BG tasks, such as one or more BG maintenance tasks that can execute to reduce the accumulated debt with respect to a resource at a critical level.

In at least one embodiment, different types of MD updates can be performed to a MD page. One MD update type can be referred to as a decref operation which decrements a reference count stored in an entry of a MD page. Data deduplication can generally be characterized as a data reduction operation that recognizes duplicate data portions in user data or content stored in the data storage system. Data deduplication stores only a single unique instance of a data portion that can be referenced multiple times such as by being stored at multiple logical addresses of multiple LUNs or other storage objects. In at least one embodiment data deduplication can be performed inline as part of processing a write I/O operation writing content C1, where data deduplication processing determines whether or not C1 is a duplicate of existing content already stored in the data storage system. Data deduplication processing can also be performed offline or on stored content of a storage object. As various logical addresses or target locations are overwritten over time, existing content stored at a logical address can be overwritten with new content. As a result, counts or references to uniquely stored data portions can vary over time. In at least one embodiment, a MD page can maintain a reference count associated with a stored unique data portion or content, where a reference count denotes a number of references or logical addresses of storage objects that reference the associated content. Thus, a reference count greater than 1 indicates the associated content is referenced generally multiple times by multiple logical addresses or locations. As existing logical addresses or locations storing existing content C1 are updated or overwritten with new content C2, the reference count associated with C1 can decrease by 1. An update to a MD page including the reference count for stored content such as C1 can be made in connection with flushing a recorded write operation that overwrites C1 with C2 at a logical address. In at least one embodiment, the update to the reference count when overwriting the logical address's content of C1 with updated contents C2 can include decreasing an associated reference count or performing a decref operation with respect to an entry of a MD page storing the reference count for C1. In at least one embodiment, the decref operation can be considered a BG maintenance task that can be delayed, deferred or postponed and thereby can result in an increase in decref debt. In at least one embodiment, decref debt can be represented by the number of decref operations deferred or postponed. In at least one embodiment, decref MD update operations stored in the MD log can be flushed from the MD log and stored temporarily in another form in non-volatile storage of a decref tier of storage. Thus the decref tier can store the deferred decref operations. At a later point in time in at least one embodiment, multiple deferred decref operations updating the same MD page can be processed in bulk to generate an updated MD page. The updated MD page can be persistently stored, for example, in a MD page store. Deferring the decref operations and storing them temporarily as records in the decref tier allows for increased efficiency in processing multiple deferred decref operations that update the same MD page. The multiple deferred decref operations that update the same MD page can be aggregated and applied to the same MD page that is then persistently stored. Thus the efficiency of the foregoing application of aggregated decref operations applied to the same MD page can be expected to increase generally the greater the accumulated decref debt. In at least one embodiment, the decref debt can be measured in terms of a number of deferred decref operations stored in the decref tier. The amount of debt reduction or debt processed by a decref BG maintenance task can be measured, for example, as a number of deferred decref operations of the decref tier processed by the decref task.

Regulation and prioritization of all such workflows or tasks can be non-trivial. In particular, regulation of BG maintenance tasks can be especially challenging due to the various types of BG maintenance tasks with different types of collected debts, different urgencies in connection with different system resources, and the like. Also, in at least one embodiment, processing can take into account that once a BG maintenance task has started, it should be completed within some reasonable time since the BG maintenance task can hold object locks needed by other tasks. In at least one embodiment, the BG maintenance task can complete within a reasonable time even if the system resources available decrease.

In at least one embodiment, BG maintenance task regulation can be divided into two separate processing tasks provided by two components: a BG maintenance task regulator (sometimes simply referred to as a regulator) and a BG maintenance task scheduler (sometimes simply referred to as a scheduler). The BG maintenance task regulator monitors the state of the system and can decide how much of various resources may be allocated or dedicated to BG maintenance tasks. For example, the BG maintenance task regulator can determine an amount of CPU resources, such as CPU processing time in the system during a time period, can be dedicated to BG maintenance tasks. In at least one embodiment, the BG maintenance task regulator can determine, during a time period, what are the residual resources available for use with BG maintenance tasks. In at least one embodiment, resources available for consumption by consumers, such as BG maintenance tasks and other tasks, can be expressed in tokens.

The BG maintenance task scheduler can distribute available tokens or resources allocated for BG maintenance tasks among the various BG maintenance tasks such as, for example, according to task urgency and other policies.

In at least one system, an adaptive regulation mechanism can be used based on tokens as noted above, where each token can represent a same unit or fixed amount of a resource such as CPU resources. The adaptive regulation mechanism based on tokens allocated per BG task, generally, can provide certain BG processing progress or execution with reasonable impact on synchronous I/O or LCT tasks, providing a certain level of adaptiveness. However, the adaptive regulation mechanism in at least one system can have drawbacks based, at least in part, on the assumption that each BG task, such each BG maintenance task, requires approximately the same number of resources for processing to completion.

In at least one system as noted above, tokens can be used to represent resources available for allocation and consumption by the different tasks. For example, tokens can be used to represent an amount of CPU resources. In at least one embodiment, a single token denoting an amount of CPU resources can denote the assumed amount of CPU resources consumed when processing any/each BG task such as, for example, any/each BG critical task and any/each BG maintenance task. Thus, the foregoing simplifying assumption is that each BG task of all types and classes across a system needs approximately the same number of resources, such as CPU resources, for processing. However, the foregoing can be an erroneous simplifying assumption in at least one existing system that in actual execution, various BG tasks can actually consume a different amount of the CPU resource than as denoted by the single assumed token. Different BG tasks, such as different BG maintenance tasks, can have various and different CPU resource requirements rather than the same assumed amount of consumed CPU resource denoted by the single token. As a result, actual CPU resource consumption, as well as other resource consumption, among the various BG tasks can vary, Thus, when a single token is assigned to a BG task under the foregoing assumption, the impact upon the system can be unknown and random. In at least one embodiment, use of a single token noted above to generally denote the amount of CPU resources consumed by any BG task can result in the following problems discussed below.

A first problem that can result from operating under the assumption that each BG task consumes the same amount of CPU resources denoted by a single token is performance instability and jittering with respect to I/O performance. In at least one embodiment, the single token is assumed to be associated with some average CPU consumption. When CPU-intensive BG tasks are prioritized (e.g., such as a result of high debt, or other critical resource level being reached) and executed, more CPU resources than estimated by the tokens can be consumed. As a result, the system and CPU resources can actually be more overloaded than expected whereby I/O latency can be adversely impacted in that it is higher than expected. Additionally, the opposite result can occur when lightweight BG tasks are executed and actually consume less CPU time to complete than expected as denoted by the single token. In this latter case, the system can be underloaded and the CPU resources can be underutilized. It should be noted that besides general performance instability noted above, use of a single token to denote CPU or other resources expected to be consumed by any BG task to complete can make the process of performance testing and certification of changes extremely challenging. For example, it can be very difficult to differentiate an actual performance impact resulting from a tested feature from other random fluctuations or performance changes associated with execution of BG tasks.

A second problem that can result from operating under the assumption that each BG task consumes the same amount of CPU resources denoted by a single token is poor resource utilization, such as poor CPU utilization, and an underestimation of BG debt collected for deferred or postponed BG tasks. For example, as noted above, underutilization of CPU resources can occur.

A third problem that can result from operating under the assumption that each BG task consumes the same amount of CPU resources denoted by a single token is unpredictability in debt handling such as unpredictability in measuring an amount of debt incurred and unpredictability in determining an amount of resources that will be consumed when processing incurred debt. The foregoing can generally denote unpredictable and poorly controlled debt behavior. In at least one system, priority and share of overall tokens for BG tasks with respect to other tasks of higher priority (e.g., classes of tasks such as I/O or LTC tasks) can be based, at least in part, on debt size. However, based on such inaccuracies in resource requirements using the generic single token, a system generally does not have an accurate estimate of resources needed to process an accumulated debt of deferred or postponed BG tasks. In some cases, such inaccuracies can result in an inability to process the accumulated debt of BG tasks in a timely manner and can result in undesirable system states, such as, for example, result in the system stop servicing I/Os, data unavailability, and the like.

Described in the following paragraphs are techniques of the present disclosure that provide for addressing the foregoing problems.

In at least one embodiment, the techniques of the present disclosure further subdivide the BG maintenance task class or classification into subclasses, subclassifications, or subtypes based on the particular BG maintenance task. For example, in at least one embodiment, BG maintenance tasks can include the following BG maintenance task subtypes: GC task, deduplication task, compression task, decref task, and others consistent with discussion herein. For each BG maintenance task subtype, there can be multiple atomic code instances such as multiple tasks, processes, jobs, or threads of the single BG maintenance task subtype executing concurrently.

For each BG maintenance task subtype, processing can measure various metrics for each single task, thread, or generally other atomic unit of scheduling. The following paragraphs can refer to the atomic unit of scheduling to be a task or job but more generally any suitable scheduling unit can be used to denote the code entity executing that can vary with embodiment. Also, the following paragraphs can make reference to the resource of CPU time or CPU run time and specific CPU run time units. However, more generally, the techniques of the present disclosure can be used in connection with other resources and resource-associated units.

In at least one embodiment, the metrics measured for each BG maintenance task can include:

1) The actual number or amount of the resource consumed while processing the task to completion. For example, the resource can be CPU run time units or CPU cycles. The amount of CPU runtime units or CPU cycles consumed can be, for example, N milliseconds or N microseconds of CPU runtime, where N is a positive integer.

2) The task time or elapsed amount of time the task owns, possesses or holds the token. In at least one embodiment, task time can denote the elapsed time from when the task is started to when the task is completed.

3) The amount of processed debt per task or token in units relevant for the specific debt, or resource thereof.

For example, for each GC task, metrics for the foregoing items can be measured and recorded. In at least one embodiment, the amount of processed debt can relate to a unit of storage relevant to the BE non-volatile storage for which GC processing is performed. In at least one embodiment, the amount of debt processed can relate to a number of PLBs or more generally storage portions processed by the GC task or net increase in free PLBs gained as a result of execution of the single GC task. For example, the number of source PLBs processed by the GC task can be measured, where the source PLBs are partially filled with valid content and have such valid content aggregated and stored in a single target PLB. In at least one embodiment, the amount of debt processed by a GC task can be measured as the number of source PLBs processed by the GC task.

As another example in at least one embodiment, the net number increase in completely free PLBs resulting from GC task processing can be measured and denote the amount of debt processed by the GC task. For example, if valid content from 2 partially filled source PLBs is aggregated and copied to a single target PLB, the net increase in free PLBs is one (thus the debt processed can be 1 PLB for this GC task). In this example, the target PLB can include no valid content prior to GC processing. Thus, the start state is 2 partially filled source PLBs with the target PLB being free with no content (e.g., 1 free PLB). The end result of GC processing is that the 2 source PLBs are freed and the target PLB stores the aggregated valid content from the 2 source PLBs (thereby increasing the number of free PLBs from 1 to 2 with a net increase of 1 free PLB a result of GC by a single GC task instance).

In at least one embodiment, tokens can now have a "cpu-run-time" meaning expressed in a number of CPU cycles or CPU runtime units. In at least one embodiment, the BG maintenance regulator can determine how many CPU runtime units or cycles are allocated in the aggregate or overall for BG maintenance processing. The foregoing allocation can be based, at least in part, on system state, I/O latency, and/or other factors. In this manner, the token pool size can be a number of CPU cycles or CPU runtime units allowed or allocated for BG maintenance task processing across multiple concurrent BG maintenance tasks. For example, the token pool size can be C milliseconds of CPU runtime out of each 1 second of CPU runtime. Thus for example if C=100, 100 milliseconds of CPU runtime out of each second of CPU runtime can be scheduled to run one or more BG maintenance tasks.

Thus, in at least one embodiment, the token pool size allocated to BG maintenance task processing can be a number of CPU cycles or CPU runtime units allowed for BG processing.

The scheduler, when scheduling BG maintenance jobs, can take in account the expected CPU run-time of each specific BG maintenance task subtype, and optimize scheduling by making a best effort to provide for a constant BG maintenance run-time consumption of all C CPU runtime units or cycle (e.g., where C is defined by token pool size of BG maintenance tasks) on CPU cores.

Instead of maintaining N concurrent BG maintenance tasks, techniques of the present disclosure provide for maintaining a variable number of concurrent BG maintenance tasks executing such that a constant amount C of CPU cycles or CPU runtime units is consumed at runtime by BG maintenance tasks. Put another way, rather than maintaining N concurrent BG maintenance tasks executing across time, the scheduler can select any suitable number M of BG maintenance tasks to execute at each point in time, where M can vary at different points in time, so long as the aggregated consumption of CPU runtime units equals the current allocated amount of CPU runtime units or cycles, C (e.g., where C can be determined or defined by the regulator).

In this manner in at least one embodiment, the scheduler's target or goal has changed from maintaining for execution N concurrent BG maintenance tasks to maintaining a variable number of concurrent BG maintenance tasks (depending on the BG maintenance task subtypes of such tasks) over time in order to constantly consume the allocated or allowed "C" CPU runtime units or cycles.

Thus, by maintaining C as noted above in at least one embodiment, the techniques of the present disclosure can provide a constant overall BG maintenance task impact on system performance and state, independently of any particular subtype of BG maintenance task being prioritized over other BG maintenance tasks at each specific time point. By maintaining C in at least one embodiment, the techniques of the present disclosure can provide smooth and even BG maintenance task processing, increase the effective CPU utilization, and improve overall system performance and stability (e.g., jittering reduction). In at least one embodiment, the policy of the scheduler can be based, at least in part, on C, the various BG maintenance task subtypes and the corresponding amount of resources consumed by each BG maintenance task's subtype, where the techniques of the present disclosure can maintain C by varying the number of scheduled BG maintenance tasks that execute at various points in time depending, at least in part, on the amount of CPU cycles or CPU runtime units needed to complete execution of selected BG maintenance task subtypes. The goal of the scheduler can be to use its best efforts to maintain consumption of the allocated C CPU runtime units or cycles by executing a varying number of BG maintenance tasks. In at least one embodiment, the regulator can periodically determine a new or revised value for C as discussed in more detail elsewhere herein.

In at least one embodiment using the techniques of the present disclosure, debt behavior and debt-related characteristics can be better managed and estimated. The techniques of the present disclosure provide for better projection in terms of an amount of debt that can be decreased per token at runtime by BG maintenance tasks. The techniques of the present disclosure provide for better debt behavior projection and more reliable assignment of urgency and priority of BG maintenance tasks.

In at least one embodiment, based, at least in part, on debt size and an amount of debt decrease per token (e.g., such as per CPU runtime unit or cycle), the debt behavior can be more accurately projected and corresponded with client application periodicity interval, pattern, and headroom for better and more reliable BG maintenance task subtype prioritization.

In at least one embodiment, for each BG maintenance task subtype, a set of metrics can be computed and maintained as described below in connection with FIG. 3 where the resource is CPU or processing time.

Referring to FIG. 3, shown is an example 200 of metrics that can be computed and maintained for each BG maintenance task subtype in at least one embodiment in accordance with the techniques of the present disclosure.

In at least one embodiment, the metrics of 200 for each BG maintenance subtype can be stored in a descriptor with the metrics stored in fields or entries of the descriptor as a data structure stored in a form of memory or storage. For example, in at least one embodiment where the BG maintenance task subtypes include a GC task, a decref task, a data deduplication task, and a data compression task, a set of metrics of 200 can be computed and maintained for each of the foregoing 4 BG maintenance task subtypes that can consume the CPU resources of a system by executing on one or more cores of the system.

For purposes of illustration in some examples, the following paragraphs can provide further detail for the BG maintenance task subtype of GC.

The example 200 includes the following fields: average CPU runtime per task 202; average task time 204; average CPU runtime per task per second 206; average Debt processed per task 208; and a temporary averaging area 210.

The average CPU runtime per task 202 can denote the average CPU runtime or average amount of CPU resources consumed by a particular BG maintenance task subtype such as GC. For example, the average CPU runtime per task 202 can be a number of milliseconds or microseconds.

The average task time 204 can denote the average amount of elapsed time tasks of a particular BG maintenance task subtype such as GC task time can take to complete. The elapsed time can denote the amount of time from when the task is started to when the task is completed whereby the tokens held by the task are returned to the pool of tokens available for reuse or reallocation to another BG mainte nance task. For example, the average task time 204 can be expressed as a number of seconds.

The average CPU runtime per task per second 206 can denote a CPU runtime task rate per second. In at least one embodiment, the average CPU runtime per task per second 206 can be calculated or derived from fields 202 and 204. In at least one embodiment, the value for 206 can be calculated as the value of the average CPU runtime per task 202 divided by average task time 204. For example, if the average CPU runtime per task 202=10 microseconds and the average task time 204 is 2 seconds, then the average CPU runtime per task per second 206=10 microseconds/2 seconds=5 microseconds per second. Consistent with other discussion herein in at least one embodiment, the value of 206 for a particular BG maintenance task subtype, such as a GC task subtype, can denote an average number of tokens needed or consumed to complete execution of a GC task instance. In at least one such embodiment as discussed elsewhere herein, a single token can be equal to "1 microsecond of CPU core runtime per second".

The average debt processed per task 208 can denote some unit or measurement of accumulated debt that is processed by execution of a task of a particular BG maintenance subtype. For example GC tasks can reduce the accumulated GC debt with respect to performing GC of BE non-volatile storage as described in more detail elsewhere herein. For the BG maintenance task subtype of GC in at least one embodiment, the debt can relate to a system resource of BE non-volatile storage where execution of each GC task can result in increasing the number of free PLBs by J PLBs, where J can generally be an integer value greater than or equal to 1. Thus in at least one embodiment, the average debt processed per GC task can be the average net increase in the number of free PLBs. In at least one embodiment, the debt measurement or metric 208 can vary with the task subtype. As another example for the BG maintenance task subtype of decref, the average debt processed per task 208 can denote an average number of deferred decref operations processed by decref tasks. As another example for the BG maintenance task subtype of data deduplication the average debt processed per task 208 can denote an average number of blocks or units of storage containing data or content processed by data deduplication tasks, or an average rate (e.g., MBs/second) at which data or content is processed by data deduplication tasks. As another example for the BG maintenance task subtype of compression, the average debt processed per task 208 can denote an average number of blocks or units of storage containing data or content that is compressed by compression tasks, or an average rate (e.g., MBs/second) at which data or content is compressed by compression tasks.

The temporary averaging area 210 can be generally used as a work area to store temporary totals used in calculating the averages 202, 204, 206 and 208 such as for the most recent or last "K" tasks of the particular BG maintenance subtype. For example in at least one embodiment, K can be 5.

In at least one embodiment at start up time before any actual measured values are obtained to calculate the averages 202, 204, 206 and 208, fields 202, 204, 206 and 208 can be initialized to some predetermined reasonable value that can then be dynamically adjusted over time as actual measured values are obtained.

In at least one embodiment, each BG maintenance task that is executed can be tracked to measure its CPU runtime, overall task time and processed debt. In at least one embodiment, the overall task time can denote the amount of elapsed time from when the task starts to when the task completes processing. Upon completion of the task, the foregoing values can be added to corresponding totals maintained in the temporary averaging area 210 until K such instances of the values have been accumulated in the totals of 210. Once the totals have been accumulated for K tasks, the totals can be used to compute updated averages for fields 202, 204, 206 and 208; and the area 210 can then be zeroed to prepare for the next averaging cycle of K instances from K tasks of the particular BG maintenance task subtype. Thus, in at least one embodiment, the descriptor 200 maintained for each BG maintenance task subtype can contain the actual observed data averaged for the most recent K tasks to avoid an impact of any random fluctuations and inaccuracies that may otherwise be incurred using other means.

Figure 4A:
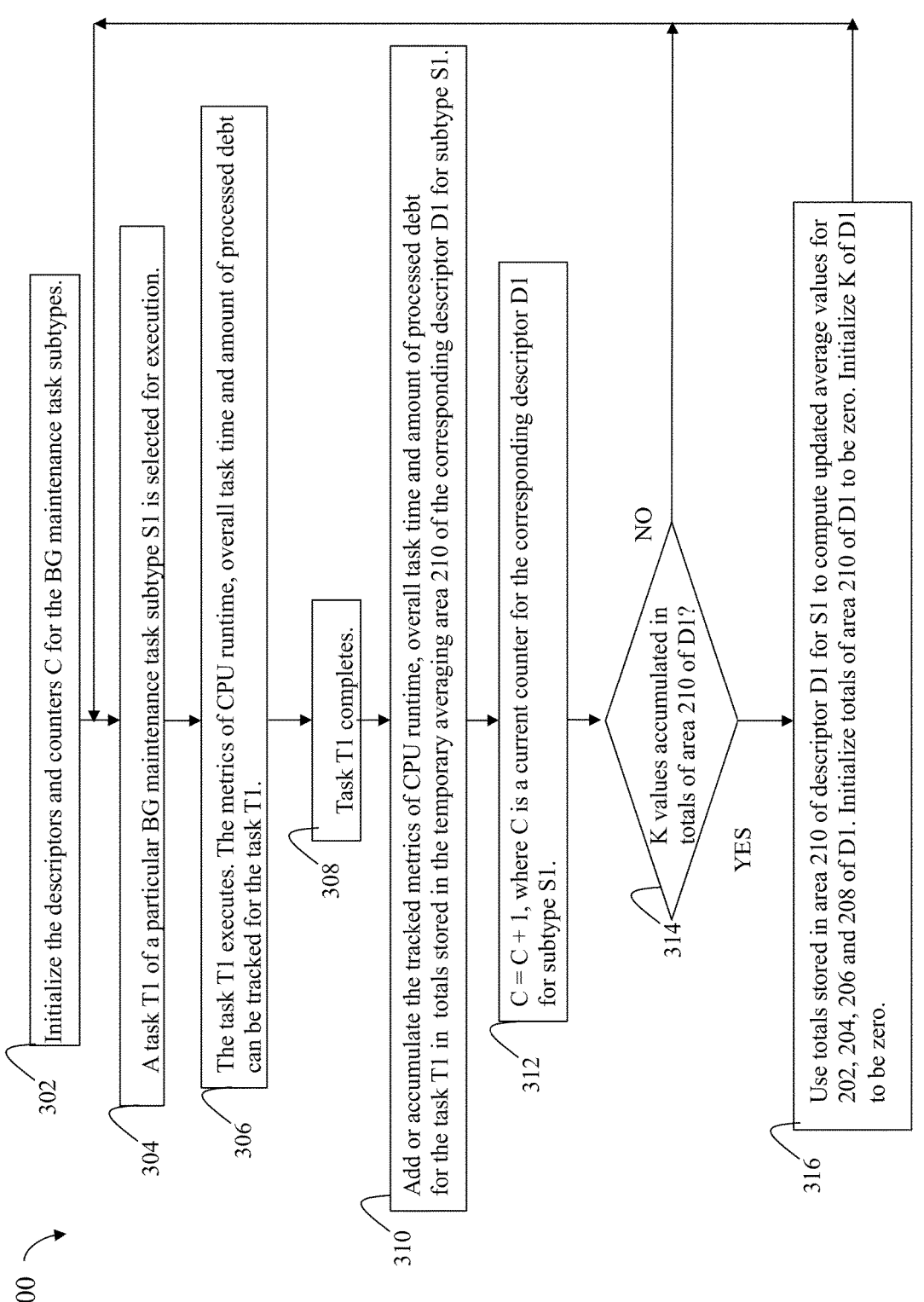

Referring to FIG. 4A, shown is a flowchart 300 of processing steps that can be performed in at least one embodiment in accordance with the techniques of the present disclosure. The flowchart 300 summarizes processing noted above in connection with FIG. 3 to collect various metric values and calculate averages of the descriptors for the different BG maintenance task subtypes.

At the step 302, processing can be performed to initialize the descriptors and counters K for the BG maintenance task subtypes. In at least one embodiment, each descriptor D1 associated with a particular one of the subtypes S1 can have its own corresponding counter C denoting the current number of tasks whose metrics have been collected and accumulated in the totals of the temporary averaging area 210 of the descriptor D1. In at least one embodiment, a current value of C for a particular descriptor D1 can also be stored in the area 210. From the step 302, control proceeds to the step 304.

At the step 304, a task T1 of a particular BG maintenance task subtype S1 is selected for execution. From the step 304, control proceeds to the step 306.

At the step 306, the task T1 executes. The metrics of CPU runtime, overall task time and amount of processed debt can be tracked for the task T1. From the step 306, control proceeds to the step 308.

At the step 308, the task T1 completes. From the step 308, control proceeds to the step 310.

At the step 310, processing can be performed to add or accumulate the tracked metrics of CPU runtime, overall task time and amount of processed debt for the task T1 in the totals stored in the temporary averaging area 210 of the corresponding descriptor D1 for subtype S1. From the step 310, control proceeds to the step 312.

At the step 312, C is incremented by 1 where C is a current counter for the corresponding descriptor D1 for subtype S1. An updated value for C can be stored, for example, in the area 210 of D1. From the step 312, control proceeds to the step 314.

At the step 314, a determination can be made as to whether K values have been accumulated in totals of area 210 of D1. Put another way, the step 314 can include determining whether C of D1 is equal to K, denoting the number of tasks in a single cycle for which averages of D1 are determined. If the step 314 evaluates to no, control proceeds to the step 304 to perform processing for the next task awaiting execution. If the step 314 evaluates to yes, control proceeds to the step 316.

At the step 316, processing can be performed to use the totals stored in area 210 of descriptor D1 for S1 to compute updated average values for 202, 204, 206 and 208 of D1. The step 316 can also include initializing totals of area 210 of D1 to be zero; and initializing K of D1 to be zero in preparation for the next cycle for data gathering used to compute updated averages for 202, 204, 206, and 208. From the step 316, control proceeds to the step 304 to perform processing for the next task awaiting execution.

What will now be described is additional detail regarding the regulator in at least one embodiment in accordance with the techniques of the present disclosure.

In at least one embodiment, the regulator can be a BG maintenance task regulator that regulates or controls the amount of CPU resources as well as other resources allocated for use by BG maintenance tasks. In at least one embodiment, the regulator can periodically assess, in accordance with one or more feedback metrics, the state of the system and can accordingly determine a set of regulator outputs (sometimes referred to as outputs) described below. Additionally, examples of feedback metrics that can be used in at least one embodiment are also described below.

In at least one embodiment, the feedback metrics can include for example, current I/O latency, one or more debt-based measurements or metrics (e.g., such as current debt levels), and/or one or more debt-based thresholds. Consistent with other discussion herein, the debt-based metrics can vary with the particular BG maintenance subtypes. For example, for GC in at least one embodiment, feedback metrics can include a first feedback metric denoting a current amount or percentage of free or available BE non-volatile storage. When the first feedback metric falls below a corresponding minimum threshold, the amount of free or available BE non-volatile storage can be characterized as reaching a critical threshold level triggering the need to increase progress in performing GC to increase the amount of free or available BE non-volatile storage. In at least one embodiment, if the first feedback metric falls below the critical threshold level, the amount of CPU resources allocated for BG maintenance tasks can be increased to allow for scheduling additional GC tasks and/or allow additional time for making progress in GC tasks that have commenced but not yet completed execution. In this manner, the I/O latency may temporarily increase while such additional resources are allocated to execution of GC tasks rather than, for example, synchronous I/O processing tasks. In at least one embodiment under normal conditions or operating mode without the amount of free BE non-volatile storage falling below the critical threshold, minimizing I/O latency can be a highest priority such that BG maintenance tasks can operate based on the residual principle as discussed elsewhere herein. However, when conditions of the state of the system based on the first feedback metric indicate that the system is below the critical threshold level of free BE non-volatile storage, minimizing I/O latency can be lowered in priority temporarily while the amount of free BE non-volatile storage is increased to an acceptable level or second threshold through additional resource allocation to GC task processing rather than synchronous I/O processing. The second threshold can be larger than the critical threshold level. Once the amount of free BE non-volatile storage reaches the second threshold, the system can transition back to the normal conditions or operating mode where BG maintenance tasks operate on the residual principle, I/O latency has the highest/higher priority, and where the system is not in the state of possibly running out of free BE non-volatile storage. Additionally, in at least one embodiment, the system can continue to monitor current I/O latency while the system has given additional CPU resources to BG maintenance tasks such as GC tasks to increase the amount of free BE non-volatile storage. If the system achieves a level of free BE non-volatile storage that exceeds the critical threshold but has not yet reached the higher second threshold, and the I/O latency becomes too large (e.g., above an acceptable latency threshold), then the system can shift a portion of the additional CPU resources back to synchronous I/O tasks. In a similar manner in at least one embodiment, if an accumulated debt of a certain type exceeds a threshold level, then the system, such as the regulator, can shift or allocate additional resources, such as additional CPU resources, for use with BG maintenance tasks, and in particular, for use by one or more relevant subtypes of BG maintenance tasks to alleviate or reduce the particular type of accumulated debt.

As another example in at least one embodiment, the decref tier discussed elsewhere herein can persistently store deferred, delayed or postponed decref operations to be applied to persistently stored MD pages. The decref debt can be measured, for example, by the number of decref operations stored in the decref tier, the amount or percentage of free storage in the decref tier and/or the amount or percentage of consumed storage in the decref tier. In a manner similar to that discussed above for the BE non-volatile storage, any of the foregoing decref related metrics can be included in the feedback metrics provided to the regulator. In a manner similar to that discussed above for the BE non-volatile storage, for example, if the amount of free storage in the decref tier falls below a critical threshold denoting an impending out of storage condition on the decref tier, additional resources including CPU resources can be allocated for use with BG maintenance tasks and in particular for use by the decref tasks that process the deferred decrefs stored in the decref tier (e.g., to thereby decrease the decref debt and increase the amount of free storage in the decref tier). As another example, if the amount of consumed or used storage in the decref tier exceeds a threshold level denoting an impending out of storage condition on the decref tier, additional resources including CPU resources can be allocated for use with BG maintenance tasks and in particular for use by the decref tasks that process the deferred decrefs stored in the decref tier (e.g., to thereby decrease the decref debt and increase the amount of free storage in the decref tier). As another example, if the number or amount of deferred decrefs stored in the decref tier exceeds a threshold level, additional resources including CPU resources can be allocated for use with BG maintenance tasks and in particular for use by the decref tasks that process the deferred decrefs stored in the decref tier (e.g., to thereby decrease the decref debt and increase the amount of free storage in the decref tier).

In accordance with the inputs provided to the regulator, including at least one or more feedback metrics, the regulator in at least one embodiment can determine outputs including: a token pool size of the CPU resources allocated for executing BG maintenance tasks; a list of CPU cores where BG maintenance tasks are allowed to run or execute; and a distribution of the tokens of the token pool (allocated for BG maintenance tasks) among the various allowed processing cores of the list.

In at least one embodiment, the token pool size of the CPU resources allocated for executing BG maintenance tasks can be expressed as an integer number of tokens. In at least one embodiment, each token can denote an amount of CPU resources such as, for example, one or more CPU cycles or runtime units. In at least one embodiment, the token pool size can denote the total overall amount or percentage of CPU runtime allocated each second for BG maintenance processing across the entire system such as all cores of the system. In at least one embodiment, a single token of the token pool allocated to BG maintenance tasks can denote "one (1) microsecond of CPU core runtime per second" (e.g., out of each second of task time, 1 microsecond is allocated for BG maintenance processing for each single token), although other suitable values can be used to denote a CPU runtime unit represented by a single token of the token pool allocated to BG maintenance tasks.

In at least one embodiment, the list of CPU cores of the system where BG maintenance tasks are allowed to run or execute can include any of: one or more dedicated cores where only BG maintenance tasks are running (e.g., only BG maintenance tasks scheduled by the scheduler are running on the dedicated core); and one or more shared or mixed cores where BG maintenance tasks are running along with other tasks. The other tasks can include, for example, BG critical tasks and/or synchronous I/O processing tasks.

In at least one embodiment, the token pool size can correspond to the core capabilities of the list of CPU cores. Put another way, the amount of CPU resources denoted by token pool size should not exceed the amount of CPU resources denoted by the list of allowable CPU cores where the BG maintenance tasks are allowed to run or execute. In at least one embodiment, the regulator can be responsible for allocating a sufficient number of CPU cores to accommodate the allocated CPU resources (e.g., the allocated runtime per second) as defined by the token pool size.

In at least one embodiment, the distribution of tokens output can denote the distribution of tokens of the pool among the various CPU cores on the list (e.g., assigning each of the CPU cores on the list a corresponding number of tokens from the pool). In at least one embodiment, the distribution can provide for ideally having a balanced workload among the cores of the system. In at least one embodiment, the number of tokens of the pool distributed among the dedicated BG maintenance cores can correspond to 100% core utilization or full utilization of such dedicated cores. Put another way in at least one embodiment, if a dedicated core executing only BG maintenance tasks has 100% CPU utilization=X CPU cycles or runtime units, the number of tokens allocated from the pool to the dedicated core can equal X. In at least one embodiment, a reduction factor can be applied under the assumption that there may be execution inefficiencies such that 100% of each core's processing capability may not actually be used for task execution. The reduction factor, if any, applied can be determined in any suitable manner and can vary with the particular system. In at least one embodiment operating on the residual principle, the number of tokens distributed to shared or mixed cores can correspond to non-utilized CPU cycles or runtime of such cores that is not otherwise utilized by non-BG maintenance tasks. With shared or mixed cores, the same reduction factor can also be applied in at least one embodiment as with the dedicated cores. In at least one embodiment, an estimation of the non-utilized CPU cycles or runtime of shared cores running BG maintenance tasks as well as other classes of tasks can be determined, for example, directly by using monitoring statistics regarding actual observed CPU utilization or consumption by the non-BG maintenance tasks. As an alternative in at least one embodiment, the estimation of the non-utilized CPU cycles or runtime of shared cores can be determined by approximation such as based, at least in part, on the number of concurrent non-BG maintenance tasks assigned for execution on the shared core and an expected amount of CPU resources consumed by such non-BG maintenance tasks. Generally, any suitable technique can be used to estimate the amount of residual or remaining CPU cycles or runtime that are unused by non-BG maintenance tasks assigned to the shared core, where the residual or remaining CPU cycles or runtime units can denote the amount of remaining CPU cycles or runtime units available for BG maintenance tasks. In response, the techniques of the present disclosure can allocate to the shared core an amount of tokens from the token pool that corresponds to foregoing residual or remaining CPU cycles or runtime units of the shared core.

In at least one embodiment, the distribution of tokens can generally denote the distribution of all tokens from the token pool across all cores in the list. In following paragraphs, the portion of tokens of the token pool (allocated for BG maintenance tasks) assigned to a particular core can be referred to as the number of BG maintenance tokens assigned to the core and can sometimes be denoted as the variable BG_Tokens_Assigned_to_Core. Thus for each core on the list output by the regulator, an instance of BG_Tokens_Assigned_to_Core can be maintained denoting the number of tokens of the pool distributed to the particular core. Generally, BG_Tokens_Assigned_to_Core can denote a resource consumption limit or quota of a particular core.

As noted elsewhere herein, the BG maintenance scheduler can have a target or goal of scheduling and maintaining a variable number of concurrent BG maintenance tasks of possibly different subtypes such that they entirely consume all tokens of the token pool as distributed across all cores of the list. Put another way, the variable number of concurrent BG maintenance tasks scheduled can fully utilize and consume all allocated resources, such as all allocated CPU resources of the token pool and such as all tokens distributed to each core in the list.

Figure 4B:
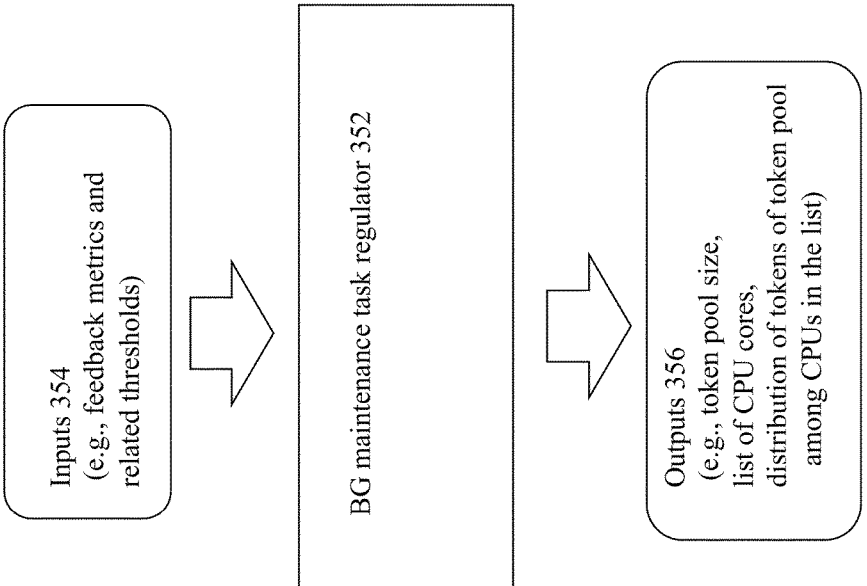
FIG. 4B is an example of illustrating inputs and outputs of a BG maintenance task regulator in at least one embodiment in accordance with the techniques of the present disclosure.

Referring to FIG. 4B, shown is an example 350 illustrating the BG maintenance task regulator in at least one embodiment in accordance with the techniques of the present disclosure. Consistent with discussion above and elsewhere herein, the BG maintenance task regulator 352 can receive inputs 354 and generate outputs 356. The inputs 354 can include, for example, one or more feedback metrics and related thresholds as described above. The outputs 356 can include, for example, the token pool size, the list of CPU cores, and the distribution of tokens of token pool among CPUs in the list as described above.

Described below are various core assignment and scheduling algorithms that can be performed by the scheduler for BG maintenance tasks in at least one embodiment in accordance with the techniques of the present disclosure. The following description below can make reference to FIG. 5.

Figure 5:
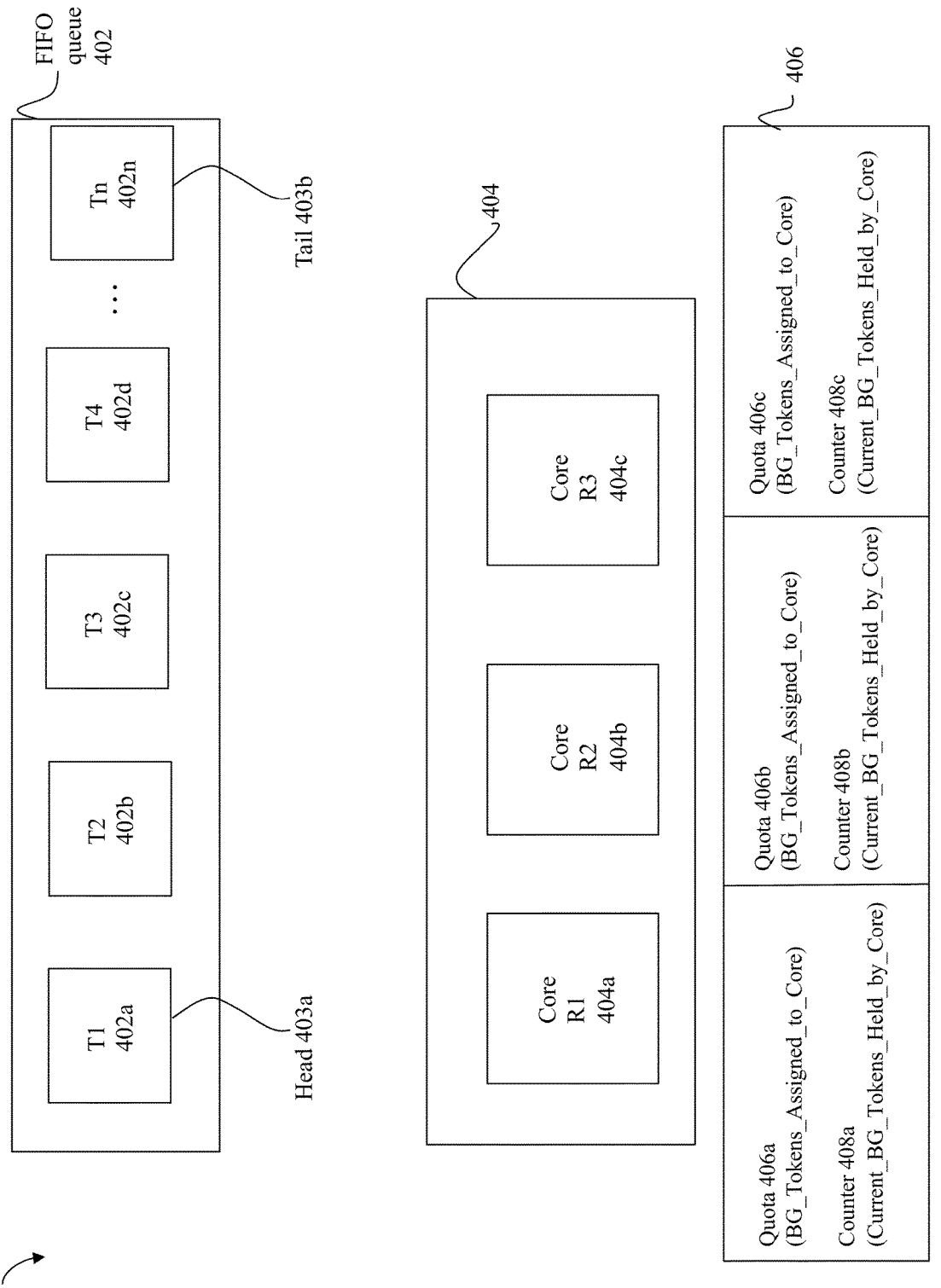
FIG. 5 is an example illustrating BG maintenance tasks, cores and associated counters and quotas in at least one embodiment in accordance the techniques of the present disclosure.

Referring to FIG. 5, shown is an example 400 illustrating various components in at least one embodiment in accordance with the techniques of the present disclosure.

The element 402 can denote a queue of BG maintenance tasks awaiting scheduling and assignment to a core for execution. In at least one embodiment, the queue 402 can be a FIFO (first in first out) queue of tasks where new tasks awaiting scheduling and core assignment can be added to the tail 403b of the queue 402, and where tasks can be selected for core assignment and scheduling from the head 403a of the queue 402. In the example 400, the queue 402 includes the BG maintenance tasks 402a-n.

The element 404 can denote the set of cores to which BG maintenance tasks can be assigned by the scheduler to execute. The set of cores 404 in the example 400 include the cores 404a-c for purposes of illustration where each such core can be a dedicated core or a shared core as discussed elsewhere herein. For each of the cores 404a-c of the set 404, a corresponding set of variables of 406 can be maintained. For the core R1 404a, the quota 406a and counter 408a can be maintained. For the core R2 404b, the quota 406b and counter 408b can be maintained. For the core R3 404c, the quota 406c and counter 408c can be maintained. The quota associated with a particular core can denote the number of tokens distributed to the particular core. Thus the sum of the quotas 406a-c in this example can denote the aggregated total number of tokens and thus CPU runtime units or cycles currently allocated in the system for executing BG maintenance tasks. Each of the quotas 406a-c corresponding to a particular one of the cores 404a-c can represent the resource consumption limit or quota of tokens BG_Tokens_Assigned_to_Core distributed to the core as noted above and discussed elsewhere herein. Each of the counters 408a-c corresponding to a particular one of the cores 404a-c can represent the core's counter Current_BG_Tokens_Held_by_Core discussed below in more detail below.

In at least one embodiment, for each core 404a-c in the list that is assigned or distributed tokens from the token pool, a counter, Current_BG_Tokens_Held_by_Core, can be maintained to denote the number of tokens of CPU runtime units of the core currently being consumed. Initially when there are no BG maintenance tasks executed on or assigned to a core such as R1, the core R1's counter 406a Current_BG_Tokens_Held_by_Core can be zero. When a BG maintenance task from the queue 402 is assigned to the core R1 404a, the R1's corresponding counter 406a Current_BG_Tokens_Held_by_Core can be incremented by a number of tokens denoted by the average CPU runtime per task per second 206 obtained from a corresponding descriptor associated with the BG maintenance task subtype of the BG maintenance task assigned to the core R1 404a. When the BG maintenance task assigned to the core R1 404a has completed executing, the corresponding average CPU runtime per task per second 206 can be decremented from R1's counter 406a Current_BG_Tokens_Held_by_Core.

In at least one embodiment, when a BG maintenance task assigned to the core R1 404a completes execution, the scheduler can dequeue another waiting BG maintenance task from the queue 402 and assign it to the core R1 for execution on R1. In at least one embodiment, the scheduler can repeatedly dequeue and assign BG maintenance tasks to the core R1 so long as the counter 406a Current_BG_Tokens_Held_by_Core of core R1 (after being incremented as noted above for the dequeued task) would not exceed the quota 408a BG_Tokens_Assigned_to_Core for R1. In at least one embodiment, the queue 402 of waiting BG maintenance tasks not yet assigned to any core can be a FIFO queue as noted above. A rule or policy of the scheduler can indicate the above to repeatedly select the next BG maintenance task such as T1 402a from the head 403a of the FIFO queue 402 for assignment to the core R1 404a and increment R1's counter 406a Current_BG_Tokens_Held_by_Core by the number of tokens denoted by the average CPU runtime per task per second 206 corresponding to the subtype S1 of T1 so long as the counter 408a Current_BG_Tokens_Held_by_Core of R1 is less than the quota or limit 408a denoted by BG_Tokens_Assigned_to_Core of R1. Thus, the number of BG maintenance tasks assigned to each core can vary and can depend, at least in part, on the average CPU runtime per task per second 206 corresponding to the subtype of each BG maintenance task assigned to the core.

In at least one embodiment as noted above, the scheduler can simply select for core assignment to R1 the next BG maintenance task currently in the head position 403a of the FIFO queue 402. For example, once T1 402a is assigned to a core of 404, the head pointer 403a can point to the next task T2 402*b* in accordance with the FIFO ordering of tasks in the queue 402. Consider a case where the core R1 404*a* has 30 tokens available for allocation (e.g., R1's counter 408*a* Current_BG_Tokens_Held_by_Core has a value that is 30 less than R1's quota 406*a* BG_Tokens_Assigned_to_Core). The scheduler can select the next BG maintenance task T1 from the FIFO-based queue 402 as noted above which may be, for example, a first GC task that has an associated cost of CPU resource consumption of 20 tokens, where the corresponding value of average CPU runtime per task per second 206 for the BG maintenance task subtype of GC can be 20 CPU runtime units or cycles denoted by the 20 tokens (e.g., 1 token can equal 1 CPU runtime unit or cycle in this example). Based on the above processing, R1's counter 406*a* Current_BG_Tokens_Held_by_Core can be incremented by 20 so that now the core R1 has 10 remaining tokens available for assignment or allocation. The scheduler can determine whether it can further assign the next BG maintenance task T2 402*b* of the FIFO queue to the core R1, where the next BG maintenance task T2 402*b* can be a second GC task also having an associated cost of CPU consumption of 20 tokens. However, assigning the second GC task T2 to the core R1 would result in Current_BG_Tokens_Held_by_Core exceeding R1's token quota or limit BG_Tokens_Held_Assigned_to_Core by 10 tokens (e.g., since the second GC task assignment to R1 results in incrementing the counter Current_BG_Tokens_Held_by_Core of R1 by 20 which would result in exceeding R1's quota BG_Tokens_Assigned_to_Core). As a result, the scheduler may not assign the second GC task T2 to core R1 404*a* and can wait until a core of 404 is determined which has at least 20 tokens available for assignment to the second GC task T2. In the foregoing scenario in at least one embodiment, the remaining 10 tokens of CPU resource of core R1 can be unutilized at the current point in time since the scheduler may not proceed with assigning any other subsequent BG maintenance task of the queue 402 to R1 404*a* or any other allowable core of 404 until the second GC task T2 has been assigned to one of the cores of 404 in accordance with the FIFO order of the queue 402.

As an alternative in at least one embodiment, further optimizations can be performed by the scheduler in efforts to avoid or reduce the underutilization of CPU resources such as noted above. In at least one embodiment, a first approach or optimization can be utilized which varies from that discussed above where BG maintenance tasks can be selected for core assignment based strictly on the FIFO queue ordering of BG maintenance tasks awaiting core assignment. In at least one embodiment using the first approach, a better or best fit approach or policy can be used to select the next BG maintenance task for core assignment rather than simply select the next task from the head 403*b* of the queue 402 based on the FIFO ordering of the tasks in the queue 402. Such a best or better fit approach can include, for example, having the scheduler scan the FIFO queue 402 for one or more potential candidate BG maintenance tasks that would make better utilization of the available tokens or CPU resources such as the remaining 10 tokens noted above of the core R1. In this manner, the scheduler can assign BG maintenance tasks using a better or best fit approach or policy such that all or close to all the remaining 10 tokens of R1 are consumed via assignment to R1 where such assigned BG maintenance task(s) assigned are not required to be based on the FIFO ordering of tasks in the queue. For example, the scheduler may scan the queue 402 of BG maintenance tasks and associated values of the average CPU runtime per task per second 206 corresponding to the subtypes of the queued BG maintenance tasks, and search for a BG maintenance task which can utilize the 10 tokens of R1 or as close to all of the 10 tokens of R1 as possible. For example, the scheduler may scan the queue 402 and locate a decref task T4 402*d* that can consume the 10 tokens of R1. The decref task T4 402*d* may not be the next task at the current head 403*b* of the FIFO ordered queue 402 such the scheduler selects the decref task 402*d* bypassing, for example, tasks 402*b-c* in accordance with selecting a task that can better or best utilize the available 10 tokens of R1. For example, the scheduler can select the decref task T4 402*d* based, at least in part, on a task of the queue having a corresponding value of the average CPU runtime per task per second 206 that matches the number of available 10 tokens of R1. More generally, the scheduler can select a BG maintenance task from the queue 402 for assignment to R1 where the selected task has a corresponding value of the average CPU runtime per task per second 206 matches or otherwise is closer to 10 without exceeding 10 (e.g., select the BG maintenance task that has a minimum difference with respect to the number of available tokens 10 of R1, but where the corresponding value of the average CPU runtime per task per second 206 does not exceed the number of available tokens 10).

In at least one embodiment, a second approach or optimization can be utilized which varies from that discussed above where BG maintenance tasks can be selected for core assignment based strictly on the FIFO queue ordering of BG maintenance tasks awaiting core assignment. In at least one embodiment using the second approach, the scheduler can be allowed to exceed the BG_Tokens_Assigned_to_Core quota of a core by no more than a specified predefined threshold. In this manner, the scheduler can be provided with some flexibility in assigning BG maintenance tasks to cores for execution in balance with considering an unutilized or underutilized remaining token quota of the core. For example, the scheduler can assign the next BG maintenance task T2 402*b* of the queue 402 (in accordance with the FIFO ordering of tasks in the queue 402) to the core R1 404*a* if the amount by which R1's quota 406*a* would be exceeded is not greater than the predefined threshold. For example, assigning the next BG maintenance task T2 402*b* to R1 404*a* can be allowed if such an assignment does not result in exceeding the quota 408*a* BG_Tokens_Assigned_to_Core of R1 404*a* by more than 5% of the quota 408*a* BG_Tokens_Assigned_to_Core of R1 404*a*. The foregoing can be an alternative to leaving the remaining 20 tokens of R1 unused or underutilized by not assigning the next BG maintenance task T2 to R1. For example, assume that the scheduler is allowed to assign the next BG maintenance task T2 402*b* to R1 404*a* in accordance with the FIFO queue ordering where such assignment results in exceeding the quota 408*a* BG_Tokens_Assigned_to_Core of R1 404*a* by not more than 5% of the foregoing quota 408*a* of R1. If such an assignment is not made or not allowed, the quota remainder of 20 tokens of R1 may otherwise remain unused and underutilized where the quota remainder of 20 tokens can represent a higher relative percentage, such as 20%, of the quota than the quota excess. With the second approach, allowing the scheduler to perform BG maintenance task assignments to a core R1 that can exceed the BG_Tokens_Assigned_to_Core quota of R1 by no more than the predefined threshold can result in better utilization of CPU resources. Thus, the scheduler can be allowed to schedule BG maintenance tasks for execution on a core such as R1 even if such scheduling results in exceeding the core R1's corresponding quota by not more than the allowed specified threshold.

Referring to FIG. 6, shown is a flowchart 500 of processing steps that can be performed in at least one embodiment in accordance with the techniques of the present disclosure. The flowchart 500 summarizes processing described above regarding the scheduler scheduling and assigning BG maintenance tasks to cores in at least one embodiment.

At the step 502, each core, such as core R1, of the list of cores allowed to execute BG maintenance tasks can have a corresponding quota or limit of tokens distributed to R1 denoted by the variable BG_Tokens_Assigned_to_Core of R1. R1 can also have an associated counter, Current_BG_Tokens_Held_by_Core, denoting the number of R1's quota of tokens that are currently consumed or used. Initially the counter Current_BG_Tokens_Held_by_Core of R1 can be 0. From the step 502, control proceeds to the step 504.

At the step 504, the scheduler can assign a BG maintenance task such as T1 to the core R1 for execution on R1. T1 can be a particular subtype S1 of BG maintenance task. To reflect this assignment, the counter Current_BG_Tokens_Held_by_Core of R1 can be incremented by a number of tokens corresponding to the amount CPU resources of R1 consumed or needed to complete execution of T1. The amount of CPU resources consumed by T1 can be denoted by the number of tokens equal to the value of the field 206, average CPU runtime per task per second, of the descriptor for the subtype S1. An embodiment can use any one of a variety of different techniques to select T1 for scheduling and assignment to the core R1. Examples of such techniques that can be used to select T1 in embodiments in accordance with the techniques of the present disclosure are discussed elsewhere herein. For example, T1 can be selected as the next BG maintenance task of the queue 402 in accordance with a FIFO ordering of tasks in the queue 402; T1 can be selected in accordance with the first approach or optimization denoting a best fit approach; or T1 can be selected in accordance with the second approach or optimization that performs core assignment and scheduling while allowing a core quota to be exceeded by not more than a specified threshold. From the step 504, control proceeds to the step 506.

At the step 506, T1 can execute on the core R1 and can complete execution. When the BG maintenance task T1 completes execution on R1, the corresponding counter current_BG_Tokens_Held_by_Core of R1 can accordingly be decremented by the number of tokens corresponding to the amount of CPU resources needed to complete T1, where the number of tokens can be equal to the value of the field 206, average CPU runtime per task per second, of the descriptor for the subtype S1. From the step 506, control proceeds to the step 508.

At the step 508, in response to completing T1 on core R1, the scheduler can select for assignment and execution on R1 another BG maintenance task such as T2 from the queue of BG maintenance tasks waiting for scheduling and assignment to a core for execution. As noted in connection with the step 504 and other discussion herein, different techniques can be used in an embodiment to select T2. For example, T2 can be selected as the next BG maintenance task in accordance with a FIFO ordering of tasks in a queue; T2 can be selected in accordance with the first approach or optimization denoting a best fit approach; or T2 can be selected in accordance with the second approach or optimization that performs core assignment and scheduling while allowing a core quota to be exceeded by not more than a specified threshold.

In at least one embodiment in accordance with the techniques of the present disclosure, various characteristics and/or metrics regarding one or more types of debt can be determined and used for various purposes. For example, consider GC debt. In at least one embodiment, GC debt can be, for example, the number of PLBs that need to freed in order to meet a target threshold or level of free PLBs of BE non-volatile storage. The GC debt can continually increase as GC tasks are deferred, delayed or postponed such that there may be no progress in reducing the GC debt until the number of free PLBs reaches a critical threshold minimum level. Consistent with other discussion herein in at least one embodiment, responsive to reaching the critical threshold minimum level of free PLBs, additional resources such as additional CPU resources or tokens may be allocated to BG maintenance tasks such that the additional CPU resources can be used to execute GC tasks and make progress toward reducing the GC debt by increasing the number of free PLBs of BE non-volatile storage. Based on the average debt processed per task 208 for the subtype of GC tasks and the GC debt size, processing can be performed to calculate how many GC task instances, N1, need to complete execution to process the entire GC debt (e.g., N1=GC debt size/average debt processed per GC task 208); to calculate how many CPU runtime units or cycles of CPU resources (e.g., average CPU runtime per task*N1) are needed to process the entire GC debt; and an estimate of the amount of time to process the entire GC debt assuming a particular token pool size for BG maintenance tasks.

In at least one embodiment, one or more of the foregoing characteristics and/or metrics regarding debt such as GC debt can be provided as inputs to the regulator and/or scheduler and/or other components to determine an optimal debt processing strategy. For example in at least one embodiment, one or more of the foregoing metrics regarding GC debt can be provided as inputs to the regulator to determine the amount of CPU resources in terms of tokens allocated to BG maintenance task processing at various points in time. The amount of CPU resources denoted by the token pool size of BG maintenance tasks at each of the various point in time can be based, at least in part, on one or more of the following: predicted or projected I/O workload at the various points in time; the predicted or expected performance headroom (including amounts of unused resources such as unused CPU resources) at the various points in time; the number of GC task instances, N1, needed to complete execution to process the entire GC debt; the amount of CPU runtime units or cycles of CPU resources (e.g., average CPU runtime per task*N1) needed to process the entire GC debt; and an estimate of the amount of time to process the entire GC debt assuming a particular token pool size for BG maintenance tasks.

Headroom can generally refer to a measure of the load reserve of a storage system for handling a specified workload pattern within a specified periodicity interval. Put another way, headroom with respect to a system can generally characterize how much additional workload the system can handle based on its unused resources. A headroom metric can denote the reserved load, or remaining capability or capacity of a system to handle additional workload. A headroom metric can, for example, characterize the remaining unused resources of various components in the system. Thus, for example, the headroom of a system can increase at various points in time during periods of predicted or expected low I/O workload. In at least one embodiment, information regarding historical trends of I/O workload patterns and I/O workload levels can be used to predict future points in time of low I/O workload. During such periods of predicted low I/O workload, additional CPU resources can be allocated to GC tasks to reduce the GC debt by accordingly increasing the token pool size at predicted periods of low I/O workload.

During such periods of predicted low I/O workload, the headroom or available unused resources, such as available CPU resources, in the system can also be predicted and used to adjust (e.g., increase) or determine the token pool size for BG maintenance tasks such as GC tasks. In at least one embodiment, the regulator can use the above-noted calculation of N1 in connection with increasing BG maintenance task activity such as increasing GC task activity.

For example, the regulator can control the creation or generation of new BG maintenance tasks such as GC tasks which are then assigned to cores and scheduled to run by the scheduler. On one level to increase BG maintenance task activity and in particular increase GC by a desired amount, the regulator can generate additional new GC tasks during such predicted periods of low I/O workload where such new GC tasks are added to the queue of BG maintenance tasks waiting to be scheduled and assigned to a core for execution. For example, the regulator can use N1 to scale and determine a number of GC tasks to create for processing the GC debt during one or more predicted periods of low I/O workload. For example, assume N1=100 GC tasks need to complete execution to process the entire GC debt, and each GC task execution requires or consumes 20 tokens. Based on the foregoing simple example, 2,000 tokens (e.g., N1*20) are needed to process the entire GC debt. For simplicity, assume that during each of two time periods of low I/O workload, there are 1,000 tokens available (of unused CPU resources) for additional allocation for use with GC tasks to process the GC debt. In this case in at least one embodiment, the regulator may create N1/2=50 GC tasks to execute during each of the foregoing two time periods and thereby consume 1,000 tokens during each of the two time periods and process the entire GC debt. On a second level during such periods of predicted low I/O workload in at least one embodiment, the scheduler can give priority to selecting GC tasks from the queue of BG maintenance tasks for core assignment and execution to reduce the GC debt.

Generally, an embodiment can use any suitable metric(s) and technique(s) to determine periods of low I/O workload, predict future workload, identify periods of future predicted low workload, determine unused resources such as unused CPU resources related to headroom, and the like. In at least one embodiment, headroom and techniques for estimating headroom that can be used are described, for example, in U.S. patent application Ser. No. 17/967,240, filed Oct. 17, 2022, Data Storage System with Dynamic Workload Adjustment Based on Headroom Estimation, Kabischcher, et al., and U.S. patent application Ser. No. 18/078,366, filed Dec. 9, 2022, Techniques for Determining a Minimum Hardware Configuring Using Performance Headroom Metrics.

Referring to FIG. 7, shown is a flowchart 600 of processing steps that can be performed in at least one embodiment in accordance with the techniques of the present disclosure. The flowchart 600 generally summarizes overall processing as described above.

At the step 602, the BG maintenance task regulator (or simply regulator) can determine, in accordance with one or more inputs, a set of outputs with respect to a resource type such as CPU resources in the system. The outputs can include a token pool size of allocated tokens denoting an amount of allocated CPU resources for BG maintenance task execution, a list of CPU cores upon which BG maintenance tasks are allowed to execute, and a distribution of tokens of the pool among the CPUs in the list. The token distribution can denote quotas or limits of tokens that can be consumed by executing BG maintenance tasks. From the step 602, control proceeds to the step 604.

At the step 604, the BG maintenance task scheduler (or simply scheduler) can assign multiple BG maintenance tasks for execution on the CPU cores of the list in accordance with averages and in accordance with the token distribution. Each of the averages can denote an average number of tokens of CPU resources consumed to complete execution of a corresponding one of the multiple BG maintenance tasks of a particular BG maintenance task subtype. The averages for multiple different BG maintenance task subtypes can be determined based on actual observed, monitored or measured metric values of BG maintenance tasks of the various subtypes. From the step 604, control proceeds to the step 606.

At the step 606, as the multiple BG maintenance tasks complete execution on their corresponding assigned CPU cores, the scheduler can assign additional BG maintenance tasks to the CPU cores in accordance with a best effort policy target to continually consume all tokens of the token pool in accordance with the token distribution among the CPU cores.

The techniques of the present disclosure have been described herein with respect to a particular resource, CPU resources such as processing cores and associated CPU runtime units or cycles. More generally, the techniques of the present disclosure can be used in connection with any suitable resource. For example, the techniques of the present disclosure can be used in connection with the bandwidth of BE non-volatile storage. For example, if BE non-volatile storage includes one or more SSD tiers of storage, the BE bandwidth can denote the maximum bandwidth capability of such BE storage tiers. In at least one embodiment where the resource is the bandwidth of BE non-volatile storage, each token can denote a number of bytes written to BE non-volatile storage. In at least one embodiment, separate sets of metrics can be maintained for each resource. For example, separate token pools can be maintained for each resource, separate quotas allocated to cores for consumption by BG maintenance tasks can be maintained for each resource, separate counters for cores can be maintained for each resource, separate descriptors of resource-related metrics (e.g., as in FIG. 3 for CPU resources) can be maintained for each resource for each BG maintenance subtype, and the like.

The techniques of the present disclosure can provide for efficient smooth resource utilization such as CPU utilization by BG maintenance tasks independent of the particular subtypes or subclasses of BG maintenance tasks scheduled at a particular point in time. As a result, the techniques of the present disclosure can provide improved performance stability, predictability, and an increase in resource efficiency and utilization. In at least one embodiment, the techniques of the present disclosure can also be utilized to provide an improved optimal strategy for debt processing.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:

allocating a first amount of tokens denoting an amount of CPU resources available for executing background (BG) maintenance tasks;

determining a distribution of the first amount of tokens among a plurality of CPU cores upon which BG maintenance tasks are allowed to execute; and scheduling, by a scheduler component, a first plurality of BG maintenance tasks for execution on the plurality of CPU cores in accordance with a plurality of averages and in accordance with the distribution, wherein each of the plurality of averages denotes an average number of tokens of CPU resources consumed to complete execution of a corresponding one of the first plurality of BG maintenance tasks of a particular BG maintenance task subtype;

wherein the first plurality of BG maintenance tasks includes a first BG maintenance task of a first BG maintenance task subtype and includes a second BG maintenance task of a second BG maintenance task subtype, wherein the first BG maintenance task of the first BG maintenance task subtype has a first corresponding one of the plurality of averages denoting an average number of tokens of CPU resources consumed to complete execution of any BG maintenance task having the first BG maintenance task subtype, wherein the second BG maintenance task of the second BG maintenance task subtype has a second corresponding one of the plurality of averages denoting an average number of tokens of CPU resources consumed to complete execution of any BG maintenance task having the second BG maintenance task subtype, and wherein the first corresponding average denotes a first number of tokens that is different from a second number of tokens denoted by the second corresponding average.

2. The computer-implemented method of claim 1, wherein the first BG maintenance task executes on a first core of the plurality of CPU cores, wherein the first core has a first quota and a first counter, wherein the first quota denotes a portion of the first amount of tokens distributed to the first core, wherein the first counter denotes an amount of the first quota currently consumed by executing one or more BG maintenance tasks on the first core.

3. The computer-implemented method of claim 2, wherein a queue includes the first plurality of BG maintenance tasks having a FIFO (first in first out) ordering, and wherein the method further comprises:

selecting, from the queue in accordance with the FIFO ordering of the first plurality of BG maintenance tasks, the first BG maintenance task for execution on the first core;

responsive to said selecting, adding the first number of tokens needed to complete execution of the first BG maintenance task to the first counter of the first core; and determining, as a result of said adding, that the first counter has a corresponding value that does not exceed the first quota of the first core.

4. The computer-implemented method of claim 3, further comprising:

completing execution of the first BG maintenance task on the first core; and responsive to said completing, performing first processing including:

decrementing the first number of tokens from the first counter of the first core; selecting, from the queue in accordance with the FIFO ordering, the second BG maintenance task for execution on the first core;

responsive to said selecting the second BG maintenance task, adding the second number of tokens needed to complete execution of the second BG maintenance task to the first counter of the first core; and determining, as a result of adding the second number of tokens, that the first counter has a value that does not exceed the first quota of the first core.

5. The computer-implemented method of claim 4, wherein said first processing includes:

updating a first plurality of totals in a first descriptor tracking metrics for the first BG maintenance task subtype in accordance with a first plurality of measured or observed values based on actual execution of the first BG maintenance task of the first BG maintenance task subtype, wherein the first plurality of measured or observed values includes a first task time denoting an elapsed amount of time that the first BG maintenance task held or owns the first number of tokens, a first CPU time denoting an amount of CPU runtime consumed to complete execution of the first BG maintenance task, and a first debt amount of first debt processed by the first BG maintenance task; and determining, in accordance with the first plurality of totals of the first descriptor, updated values for a first plurality of averages of the first descriptor, wherein the first plurality of averages denotes average values of tracked metrics for the first BG maintenance task subtype, wherein the first plurality of averages includes a first average CPU runtime of a single BG maintenance task of the first BG maintenance task subtype, a first average task time, the first corresponding average denoting a first average number of tokens corresponding to an average amount of CPU resources consumed to complete execution of a single BG maintenance task of the first BG maintenance task subtype, and a first average amount of first debt processed by a single BG maintenance task of the first BG maintenance task subtype.

6. The computer-implemented method of claim 1, wherein each of the first plurality of BG maintenance tasks is one of a plurality of predefined BG maintenance task subtypes.

7. The computer-implemented method of claim 6, wherein the plurality of predefined BG maintenance task subtypes includes a GC (garbage collection) task type, a decref (decrement reference count) task type, a compression task type, and a deduplication task type.

8. The computer-implemented method of claim 7, wherein a first of the BG maintenance tasks is the GC task type that performs GC processing on back-end (BE) nonvolatile storage used for storing user data or content of storage objects to increase an amount of free blocks of BE non-volatile storage.

9. The computer-implemented method of claim 7, wherein a first of the BG maintenance tasks is the decref task type that processes one or more deferred decref operations, wherein each of the deferred decref operations represents a MD (metadata) update operation to a MD page to decrement a reference count stored in the MD page.

10. The computer-implemented method of claim 7, wherein a first of the BG maintenance tasks is the compression task type that performs compression of content stored on BE non-volatile storage.

11. The computer-implemented method of claim 7, wherein a first of the BG maintenance tasks is the deduplication task type that performs data deduplication of content stored on BE non-volatile storage.

12. The computer-implemented method of claim 1, further comprising:

generating, by a regulator component, a first set of outputs including a token pool size corresponding to the first amount of tokens denoting an amount of CPU resources available for executing background (BG) maintenance tasks, the distribution of the first amount of tokens among the plurality of CPU cores upon which BG maintenance tasks are allowed to execute, and a list of CPU cores upon which BG maintenance tasks are allowed to execute, wherein the list includes the plurality of CPU cores.

13. The computer-implemented method of claim 1, wherein the first plurality of BG maintenance tasks scheduled by the scheduler component to consume the first amount of tokens allocated for BG maintenance tasks in accordance with the distribution.

14. The computer-implemented method of claim 1, wherein a queue includes the first plurality of BG maintenance tasks, and wherein the method further comprises:

selecting, from the queue in accordance with a best fit policy, the first BG maintenance task for execution on the first core, wherein the best fit policy specifies to select a BG maintenance task from the queue expected to consume a first number of tokens that matches a remaining amount of available tokens of the first core;

responsive to said selecting, adding the first number of tokens needed to complete execution of the first BG maintenance task to the first counter of the first core; and determining, as a result of said adding, that the first counter has a corresponding value that does not exceed the first quota of the first core.

15. The computer-implemented method of claim 1, wherein a queue includes the first plurality of BG maintenance tasks, and wherein the method further comprises:

selecting, from the queue and in accordance with a policy, the first BG maintenance task for execution on the first core, wherein the policy allows for selecting a BG maintenance task from the queue expected to consume a first number of tokens that exceeds, by not more than a threshold amount, a remaining amount of available tokens of the first core;

responsive to said selecting, adding the first number of tokens needed to complete execution of the first BG maintenance task to the first counter of the first core; and determining, as a result of said adding, that the first counter has a corresponding value that does not exceed the first quota of the first core by more than the threshold amount.

16. A system comprising:

one or more processors; and a memory comprising code stored thereon that, when executed, performs a method comprising:

allocating a first amount of tokens denoting an amount of CPU resources available for executing background (BG) maintenance tasks;

determining a distribution of the first amount of tokens among a plurality of CPU cores upon which BG maintenance tasks are allowed to execute; and scheduling, by a scheduler component, a first plurality of BG maintenance tasks for execution on the plurality of CPU cores in accordance with a plurality of averages and in accordance with the distribution, wherein each of the plurality of averages denotes an average number of tokens of CPU resources consumed to complete execution of a corresponding one of the first plurality of BG maintenance tasks of a particular BG maintenance task subtype;

wherein the first plurality of BG maintenance tasks includes a first BG maintenance task of a first BG maintenance task subtype and includes a second BG maintenance task of a second BG maintenance task subtype, wherein the first BG maintenance task of the first BG maintenance task subtype has a first corresponding one of the plurality of averages denoting an average number of tokens of CPU resources consumed to complete execution of any BG maintenance task having the first BG maintenance task subtype, wherein the second BG maintenance task of the second BG maintenance task subtype has a second corresponding one of the plurality of averages denoting an average number of tokens of CPU resources consumed to complete execution of any BG maintenance task having the second BG maintenance task subtype, and wherein the first corresponding average denotes a first number of tokens that is different from a second number of tokens denoted by the second corresponding average.

17. One or more non-transitory computer readable media comprising code stored thereon that, when executed, performs a method of comprising:

allocating a first amount of tokens denoting an amount of CPU resources available for executing background (BG) maintenance tasks;

determining a distribution of the first amount of tokens among a plurality of CPU cores upon which BG maintenance tasks are allowed to execute; and scheduling, by a scheduler component, a first plurality of BG maintenance tasks for execution on the plurality of CPU cores in accordance with a plurality of averages and in accordance with the distribution, wherein each of the plurality of averages denotes an average number of tokens of CPU resources consumed to complete execution of a corresponding one of the first plurality of BG maintenance tasks of a particular BG maintenance task subtype;

wherein the first plurality of BG maintenance tasks includes a first BG maintenance task of a first BG maintenance task subtype and includes a second BG maintenance task of a second BG maintenance task subtype, wherein the first BG maintenance task of the first BG maintenance task subtype has a first corresponding one of the plurality of averages denoting an average number of tokens of CPU resources consumed to complete execution of any BG maintenance task having the first BG maintenance task subtype, wherein the second BG maintenance task of the second BG maintenance task subtype has a second corresponding one of the plurality of averages denoting an average number of tokens of CPU resources consumed to complete execution of any BG maintenance task having the second BG maintenance task subtype, and wherein the first corresponding average denotes a first number of tokens that is different from a second number of tokens denoted by the second corresponding average.

18. The one or more non-transitory computer readable media of claim 17, wherein the first BG maintenance task executes on a first core of the plurality of CPU cores, wherein the first core has a first quota and a first counter, wherein the first quota denotes a portion of the first amount of tokens distributed to the first core, wherein the first counter denotes an amount of the first quota currently consumed by executing one or more BG maintenance tasks on the first cores.

19. The one or more non-transitory computer readable media of claim 17, wherein a queue includes the first plurality of BG maintenance tasks, and wherein the method further comprises:

selecting, from the queue in accordance with a best fit policy, the first BG maintenance task for execution on the first core, wherein the best fit policy specifies to select a BG maintenance task from the queue expected to consume a first number of tokens that matches a remaining amount of available tokens of the first core;

responsive to said selecting, adding the first number of tokens needed to complete execution of the first BG maintenance task to the first counter of the first core; and determining, as a result of said adding, that the first counter has a corresponding value that does not exceed the first quota of the first core.

20. The one or more non-transitory computer readable media of claim 17, wherein a queue includes the first plurality of BG maintenance tasks, and wherein the method further comprises:

selecting, from the queue and in accordance with a policy, the first BG maintenance task for execution on the first core, wherein the policy allows for selecting a BG maintenance task from the queue expected to consume a first number of tokens that exceeds, by not more than a threshold amount, a remaining amount of available tokens of the first core;

responsive to said selecting, adding the first number of tokens needed to complete execution of the first BG maintenance task to the first counter of the first core; and determining, as a result of said adding, that the first counter has a corresponding value that does not exceed the first quota of the first core by more than the threshold amount.

* * * * *